United States Patent [19]

Surauer et al.

[11] Patent Number: 5,931,421
[45] Date of Patent: Aug. 3, 1999

[54] ARRANGEMENT FOR ATTITUDE CONTROL AND STABILIZATION OF A THREE AXES STABILIZED SPACECRAFT

[75] Inventors: Michael Surauer, Chieming; Rolf Keeve; Nahit Ertongur, both of Ottobrunn, all of Germany

[73] Assignee: Daimler-Benz Aerospace AG, Germany

[21] Appl. No.: 08/695,602

[22] Filed: Aug. 12, 1996

[30] Foreign Application Priority Data

Aug. 11, 1995 [DE] Germany .................. 195 29 675

[51] Int. Cl.[6] .................................. B64G 1/28
[52] U.S. Cl. .................................. 244/165; 701/13
[58] Field of Search .................. 244/164, 165, 244/176; 701/13

[56] References Cited

U.S. PATENT DOCUMENTS

| | | | |
|---|---|---|---|
| 3,999,729 | 12/1976 | Muhlfelder et al. | 244/165 |
| 4,230,294 | 10/1980 | Pistiner | 244/165 |
| 5,012,992 | 5/1991 | Salvatore | 244/165 |
| 5,201,833 | 4/1993 | Goodzeit et al. | 244/165 |
| 5,269,483 | 12/1993 | Flament . | |
| 5,279,483 | 1/1994 | Blancke et al. | 244/165 |

FOREIGN PATENT DOCUMENTS

41 29 630 A1 of 1993 Germany .

OTHER PUBLICATIONS

Okanuma, Toru et al "Yaw Attitude Error Estimation of the Three–Axes Stablized satellite by State Observer", Transactions of the Society of Instrument and Control Engineers (Japan), vol. 19, No. 11, pp. 66–71.

Schrempp, W., et al "Eureca Aocs Design and Flight Experience" Advances in the Astronautical Sciences, 1994, Pub 1, by Univelt Inc., San Diego, CA, pp. 103–118.

*Primary Examiner*—Galen L. Barefoot
*Attorney, Agent, or Firm*—Evenson, McKeown, Edwards & Lenahan, P.L.L.C.

[57] ABSTRACT

An arrangement for attitude control and stabilization of a three-axis stabilized, bias momentum spacecraft which is equipped with a spin wheel arrangement that is capable of generating an angular momentum vector in a predeterminable direction, as well as control torques about all three axes of a spacecraft fixed system of coordinates, independently of one another. The control arrangement is equipped with an attitude sensor, which measures the attitude deviation about a first lateral axis (roll axis) oriented perpendicularly to the predetermined direction, with actuators for generating external control torques. A decoupling controller uses the deviations signal (roll angle phi) and takes into account the magnitude of the angular momentum generated by the spin wheel momentum arrangement, to provide a control signal which causes unidirectional decoupling of the roll dynamics from the yaw dynamics, for the spin wheel arrangement for generating a control torque about a second lateral axis (yaw axis) which is orthogonal to the predeterminable direction and to the first lateral axis.

4 Claims, 6 Drawing Sheets

FIG.7

ARRANGEMENT FOR ATTITUDE CONTROL AND STABILIZATION OF A THREE AXES STABILIZED SPACECRAFT

1. State of the Art

The current normal-mode controls for 3-axes stabilized spacecraft are based on two fundamental control concepts with basically different advantages and disadvantages.

1.1 Control Systems without Spin Stiffness

Characteristics:

The resulting spin vector is nominally infinitesimal="0"

Continuous three-axes attitude measuring (roll, pitch, yaw)

Typical attitude measuring systems:
  Earth sensor (2 axes)
  Sun sensor (1 axis) and/or star sensor (2 axes)
  Integrated gyroscopes (1 to 3 axes) OR
  Star sensor (3 axes)
  Integrated gyroscopes (3 axes)

Actuators for generating linearly independent control torques about all 3 satellite axes Typical actuator systems:
  4-reaction wheels (3-axis torques, 0.1 Nm, redundancy)
  engines (3-axis torques) for the spin discharge OR
  magneto torquer (2-axis or 3-axis torques 1–3 $\mu$Nm) for the spin discharge OR
  solar generator (2-axis torques 1–3 $\mu$Nm) for the spin discharge.

ADVANTAGES:

On the basis of the continuous 3-axis attitude measuring and the generating of independent control torques about roll, pitch and yaw, the pointing precision is determined by the measuring errors and the controller design and not by the external environmental torques.

Transition phases (for example, after the engine control for the orbit position holding) with high initial deviations and/or initial speeds can be controlled well because the control circuit amplification and the band width, as the result of the controlling torque range reaction wheels (0.1 Nm), can be selected corresponding to the requirements.

Inclined operation is possible without any additional fuel consumption.

DISADVANTAGES

High costs of the sensing system for the continuous 3-axis attitude measuring.

Thermal distortion between the reference sensor and the optical attitude sensor heads mounted at different sites in the satellite considerably impair the yaw precision.

In the case of a defect (defect in the control circuit), there is no passively stable attitude of the satellite, which represents a considerable loss of reliability in the case of long operating times (2 to 15 years).

1.2 Control Systems with Spin Stiffness

Characteristics:

The resulting spin clearly differs from "0" and nominally only has a y-component in the satellite (5–100 Nms)

WHECON Principle

Two-axis (roll, pitch) attitude measuring, in which case normally "earth sensors" are used.

Actuators for generating control torques for stabilizing nutation and orbit coupling.

Typical Actuator Systems:

Actuators for stabilizing the nutation and pitch axis
  1 bias momentum spin wheel in the y-direction and linear control torque generating about pitch and an engine pair with a "roll/yaw component" (MATRA/DASA concept)
  2 bias momentum spin wheels in the V-configuration and 1 bias momentum spin wheel and 1 reaction wheel in the L-configuration SS/LORAL concept or
  1 bias momentum spin wheel and one 1-axis gimbal mechanism (GE-ASTRO Concept)

wherein the resulting spin vector nominally points in the y-direction and linearly control torques are generated about pitch and roll.

Actuators for Stabilizing the Orbit Coupling
  An engine pair with a "roll/yaw component" DASA concept
  Magneto-torquer with a "yaw component" GE-ASTRO concept
  Solar torque compensation techniques with a "yaw component" MATRA concept (solar flaps)

ADVANTAGES of the WHECON Principle:

Robust and simple control system with the earth sensor as the attitude reference In the case of a defect (failure of the control), the satellite has a stable attitude because of the stored spin with the y-axis (spin stiffness) so that the reacquisition can be carried out by means of simple and proven strategies.

DISADVANTAGES of the WHECON Principle:

The spin stiffness also results in an undesirable coupling (nutation) between the roll and the yaw.

Transition phases with high initial attitudes and/or high initial speeds are difficult to control (nutation) and, particularly in the yaw, these can be reduced only very slowly (no yaw measuring and a very low yaw control torque 10–50 $\mu$Nm).

The yaw error is mainly a function of the "external environmental torques" and the spin in the pitch axis and can be influenced little by the controller adjustment.

An "inclined operation" is not possible by means of the DASA and MATRA concept.

At high normal operating environmental torques (>15 $\mu$Nm) and during long sat operating times (>12 years), the engine control consumes more than 25 kg of fuel (DASA concept).

1.2.2 NAMC Principle

Improved DASA Normal Mode Control 3-axis attitude measurement with an earth sensor and a sun sensor yaw estimator in the range of collinearity of the sun and the earth bias momentum spin wheel in the y-direction and linear generating of the pitch control torque generating of independent control torque pulses with separate engine pairs for the roll and yaw axis use of solar torque compensation techniques for the reduction of the fuel demand.

ADVANTAGES of the NAMC Principle:

The Use
  of the optical sun sensors and earth sensors and of a yaw estimator in the collinearity regions for the 3-axis attitude determination
  of the spin wheel and of separate roll and yaw engine pairs for generating independent control torques in the roll, pitch and yaw
considerably improves the action during the transition phases; in addition, the yaw precision is no longer determined by the external environmental torques and the pitch spin but by attitude determination errors and the controller design.

In the case of an error, the same advantages apply as to the WHECOM principle.

DISADVANTAGES of the NAMC Principle:

With respect to the "thermal distortion" between the earth and sun sensor heads, the same negative influence applies to the yaw precision as to the CONTROL SYSTEMS WITHOUT SPIN STIFFNESS "Inclined operations" requires 20 kg fuel (applies to 10 N engines, improvement by new 4 N engines by factor 2)

Although, cause of the minimal engine pulses, the roll precision is by a factor 2 better than in the case of the DASA WHECON concept, it is nevertheless limited.

2. Characteristics and Advantages of the Invention

The invention solves the previous problem areas of the previously used control systems (see State of the Art) and expands the application range by the attitude control during the position holding maneuvers with "ELECTRIC ENGINES" for several hours of maneuvering time with normal operating precisions and minimal fuel loss. The most important characteristics and significant advantages of the invention will be briefly described in the following.

2.1 Actuator Configuration for Generating Independent Control Torques about All 3 Satellite Axis and the Spin Stiffness in the Pitch Axis.

Special 4-wheel arrangement (see technical description) or 2-bias momentum spin wheels in each case swivellable in two axes with a resulting spin in the pitch axis and the possibility of generating independent control torques about all satellite axes, spin wheel discharge in selected orbit positions with engines or continuous or quasi-continuous control of the spin wheel speeds (of the spin vector) by generating external control torques by means of
engine pulses or
magneto torquers or
solar torque techniques.

2.2 Sensor Configuration—Roll, Pitch and Yaw Attitude Determination 2-axis roll and pitch attitude sensors
Two-axis roll and pitch measurement by means of earth sensor
continuous new type of YAW ESTIMATION (see technical description)
new type of ENVIRONMENTAL TORQUE COMPENSATION (see technical description)

3-axis attitude sensor system
two-axis roll and pitch measurement by means of earth sensor
continuous at least third attitude reference by star sensor or precise gyro sensor or
third attitude reference by means of sun sensor with panoramic view and orbit model in the spacecraft computer
new type of YAW ESTIMATOR for the region of the collinearity of the earth and the sun (see technical description)
new type of ENVIRONMENTAL TORQUE ESTIMATOR is used only in the collinearity region (see technical description)

2.3 Process Characteristics (see technical description)

Active NUTATION UNCOUPLING by the control algorithm also results in the UNCOUPLING of the roll and yaw dynamics when the SPIN STIFFNESS of the satellite is obtained.

The new type of YAW ESTIMATOR has the following characteristics:
Use of the transmission function of the closed roll control circuit (reduced model)
reduced yaw observer 2nd order
the yaw observability extent $\zeta$ is by approximately a power of ten $$\zeta = (OMNUT/OMORB)^{1/2}$$

OMNUT: Nutation Frequency
OMORB: Orbit Frequency
better than in the case of the previously used yaw estimators so that the response time duration is shortened by the same factor $\zeta$.

precise compensation by wheel discharge rule law of the constant environmental torques in the inertial system and precise estimation and compensation of the x-component of the constant environmental torque in the satellite reference system with external torque generators, such as S.B., magneto torquers, chemical and electric engines. The z-axis in the constant environmental torque in the satellite reference system can be compensated by way of a model factor. The basis of these precise estimates are the linear actuators (wheels) in contrast to the non-linear actuators S.G. (thermal deformation), engines, magneto-torquers (magnetic field change)).

Continuous spin control (spin wheel speed) or spin wheel discharge with external torque generators
In the case of an available yaw measurement, there are two possibilities which are equivalent with respect to the attitude precision and the fuel utilization:
Periodic spin wheel discharge with chemical engines (during SKM or during the nodal lines of the orbit) in order to optimally utilize the fuel.
Continuous control by solar torque compensation or magneto-torquer or with electric engine systems.
If no separate yaw measurement is available, there are two possibilities which result in different attitude precisions in the yawing:
Continuous control of the spin components of the wheels with the corresponding control law and environmental torque compensation (see technical description) leads to a very high yaw attitude precision, in which case the external torque generators (magneto-torquers, solar torquers) may be chemical and electric engines.
The periodic discharge (during SKM or orbit nodes) with the same external torque generators leads to an attitude precision which is approximately by a factor 2 poorer.

ADVANTAGES:

1. Active nutation uncoupling by the control algorithm when obtaining the spin stiffness of the satellite and optimal behavior during the transition phases to/after engine operating phases. The advantage of the spin stiffness to ensure in the case of a failure (failure of the control) a stable attitude of the satellite is maintained by the selected wheel configuration and, in addition, by the active nutation uncoupling of the control algorithm, the roll and yaw axis is also uncoupled so that the transitions after engine operation phases can be controlled well, in which case the required control circuit amplification and the closed loop bandwidth, because of the above-described spin/reaction wheel arrangements and the resulting quasi linear high control torque ranges (approx. =1 Nm) about all three axes, are significantly higher and therefore enormously improve the robustness of the control performance. The transitions to the engine operating phases will be described in the following and are optimized with respect to the fuel consumption and orbit interference.

The taking-over of the 3-axis reference is first carried out by means of the spin wheels as the actuators and a switch-over to the engine control does not take place before the control circuit is in the steady-state condition.

2. High attitude precision in all axes, particularly in the yaw with the earth sensor measurement alone as the basis for the attitude determination of the satellite The attitude precision in the roll and pitch is indicated by the earth sensor errors because the quasi-linear actuators (spin/reaction wheels) supported by the control algorithm (differently than in the case of the engine control) do not contribute any significant part to the attitude error budget. The calibration of the thermal distortion of sun and/or star sensors and the type of yaw attitude and yaw environmental torque compensation (see technical description) result in an enormous improvement of the attitude precision for the whole operational phase of the satellite. If no own yaw measurement is available, by means of the special yaw estimator and the "external spin wheel control" with the estimation of the environmental torque course, a significantly better yaw precision is achieved also in the normal mode.

3. Minimizing the Orbit Interference and the Fuel Consumption during the Operational Phase of the Satellite. The control with spin wheel torques about all three axes (during the transition phase, no engine pulses) and the increased yaw attitude precision, particularly when electric engines are used for station keeping maneuvers, leads to a minimal fuel consumption in the operational phase.

Other objects, advantages and novel features of the present invention will become apparent from the following detailed description of the invention when considered in conjunction with the accompanying drawings.

BRIEF DESCRIPTION OF THE DRAWINGS

Figure 7:
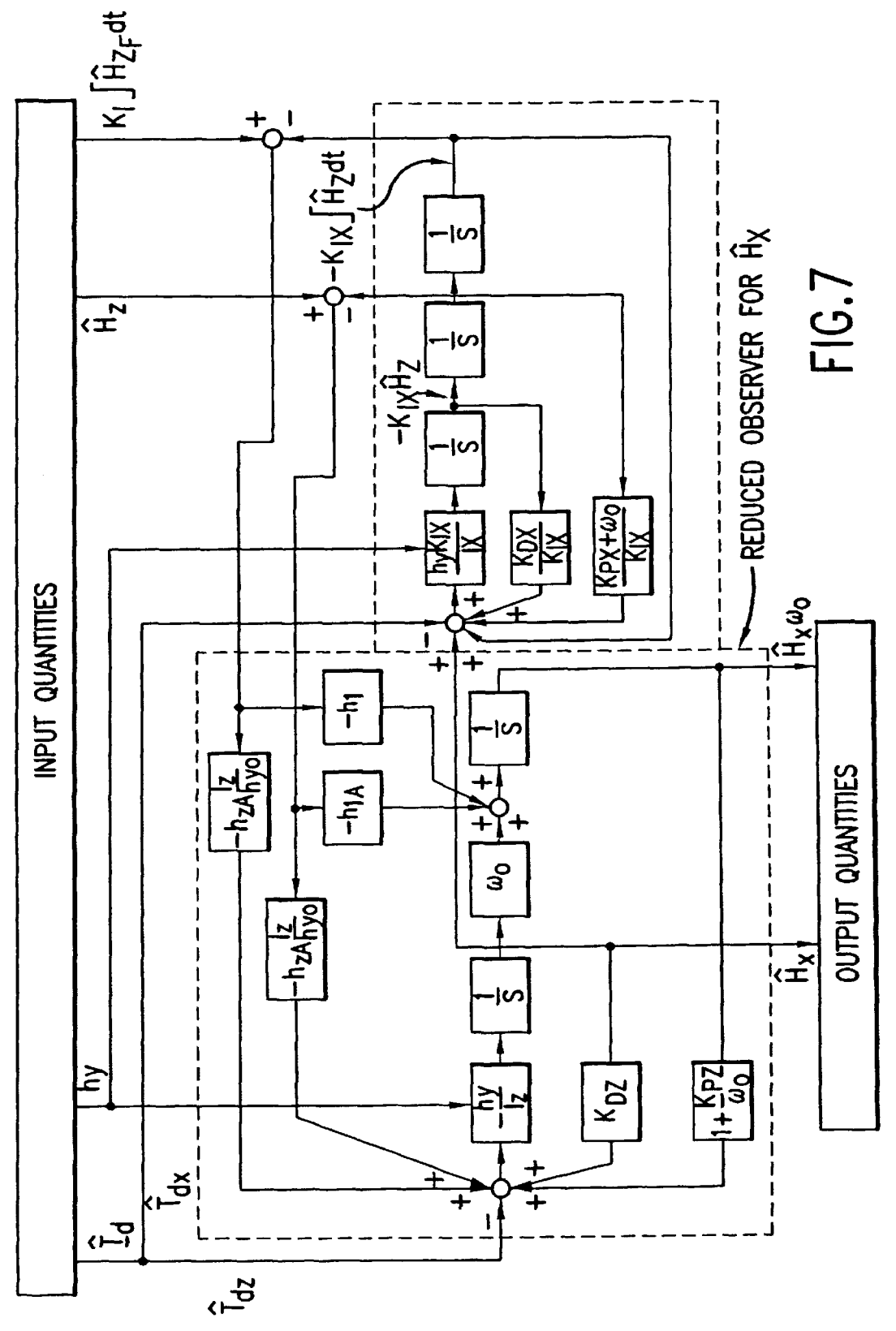

FIG. 7 is a block diagram of a further embodiment of the invention; and

Figure 1A:
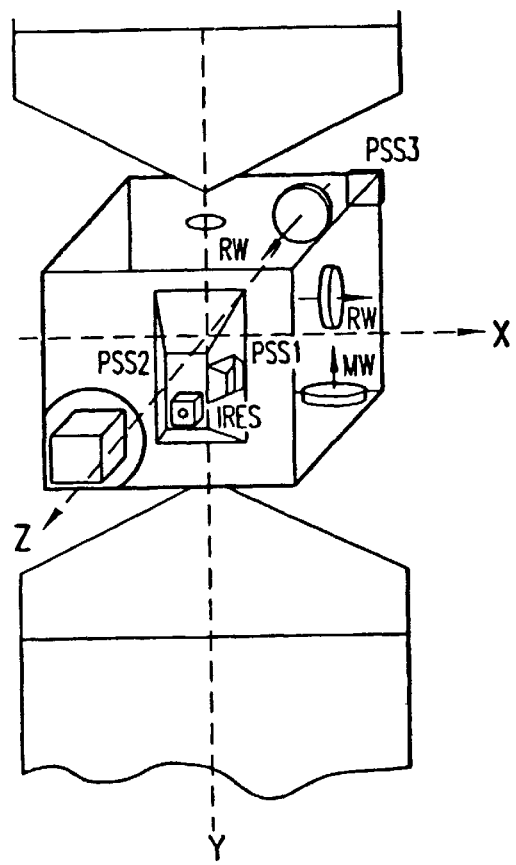
FIGS. 1A and 1B provide schematic depictions of the hardware configuration for the stabilization arrangement according to the invention.
Figure 1B:
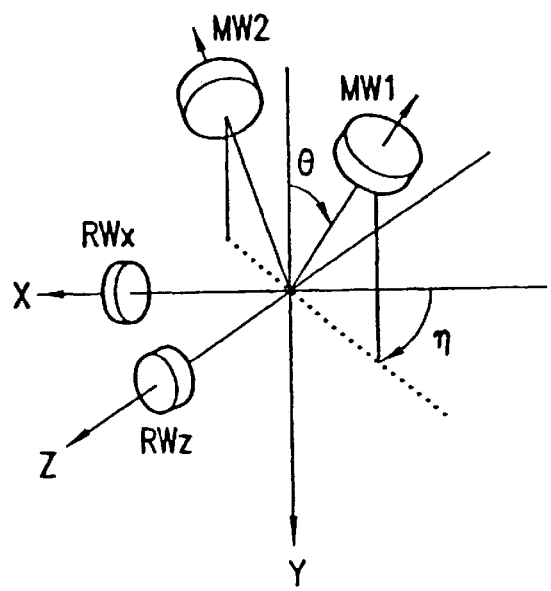
Figure 2:
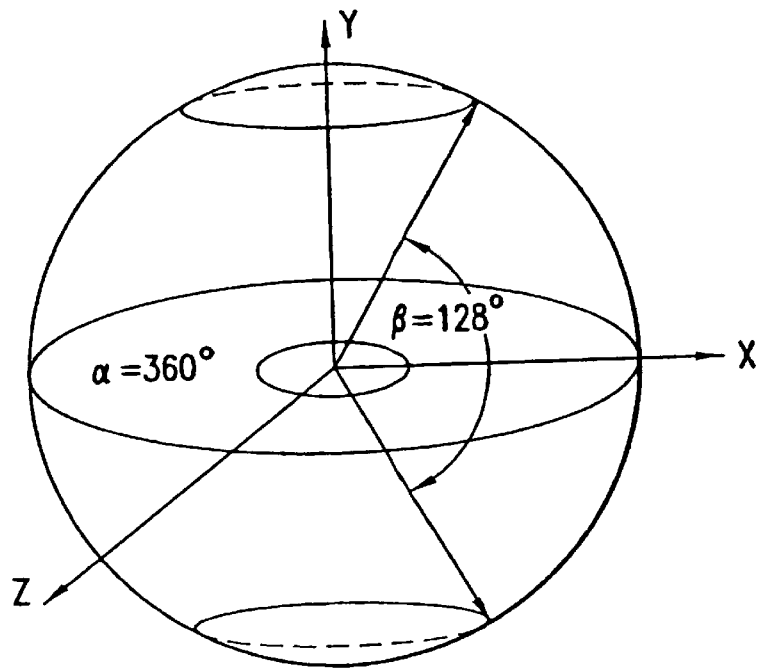
FIG. 2 is a diagram which depicts the field of sight of the sun sensor arrangement.
Figure 8:
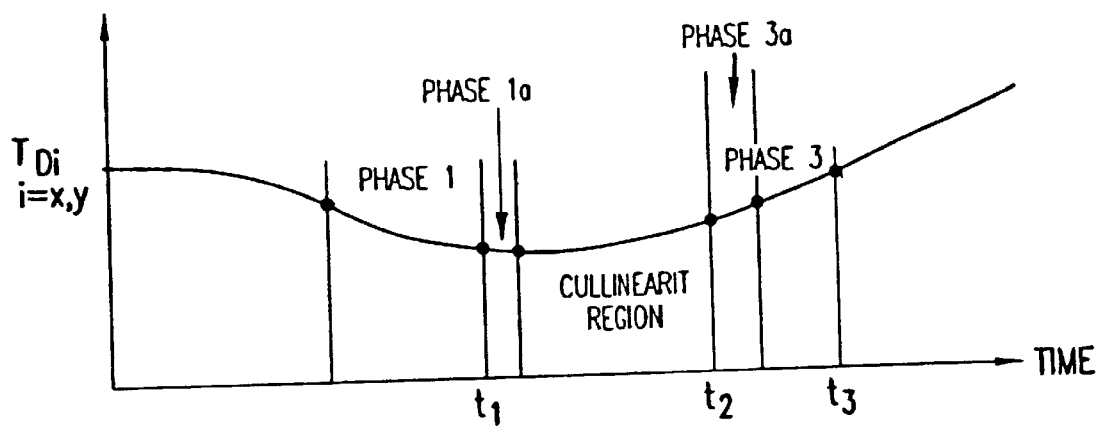
FIG. 8 is a diagram of a characteristic curve depicting environmental torque in and around the collinearity region.
Figure 3:
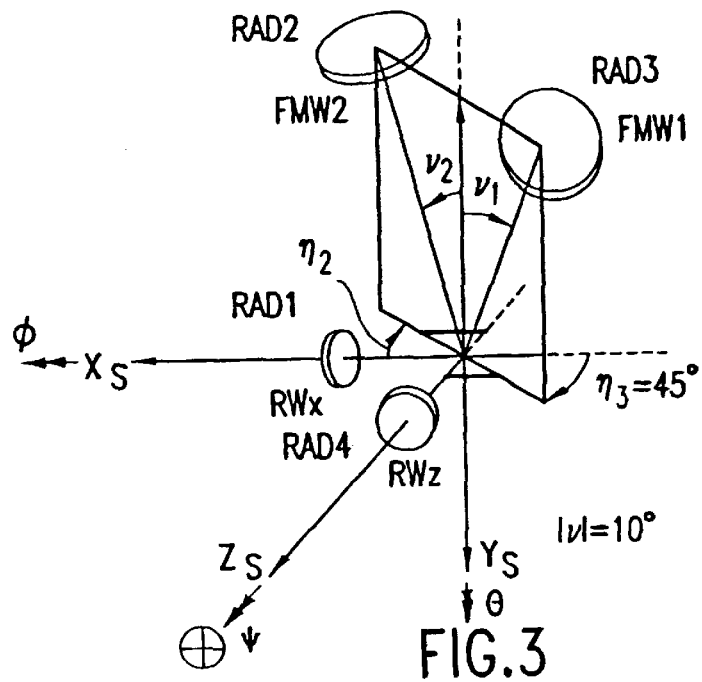
FIG. 3 is a diagram which shows the spin wheel arrangement for large rotations of the spacecraft.
Figure 4A:
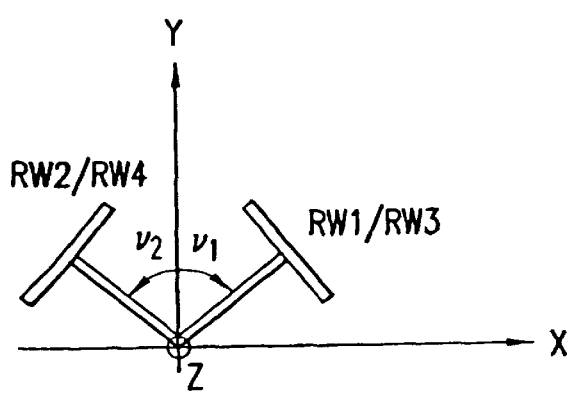
FIGS. 4A and 4B are diagrams which depict the spin wheel arrangement for small rotations of the spacecraft.
Figure 4B:
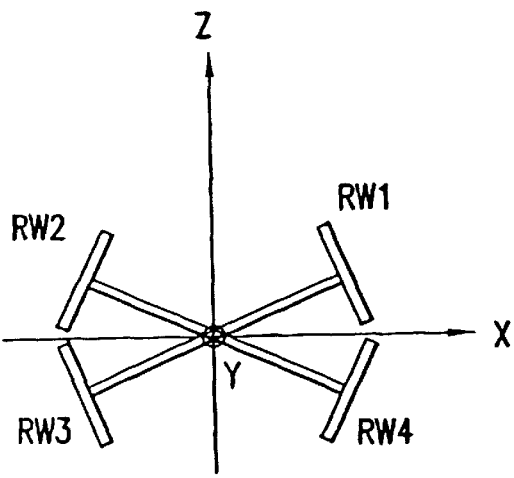
Figure 5:
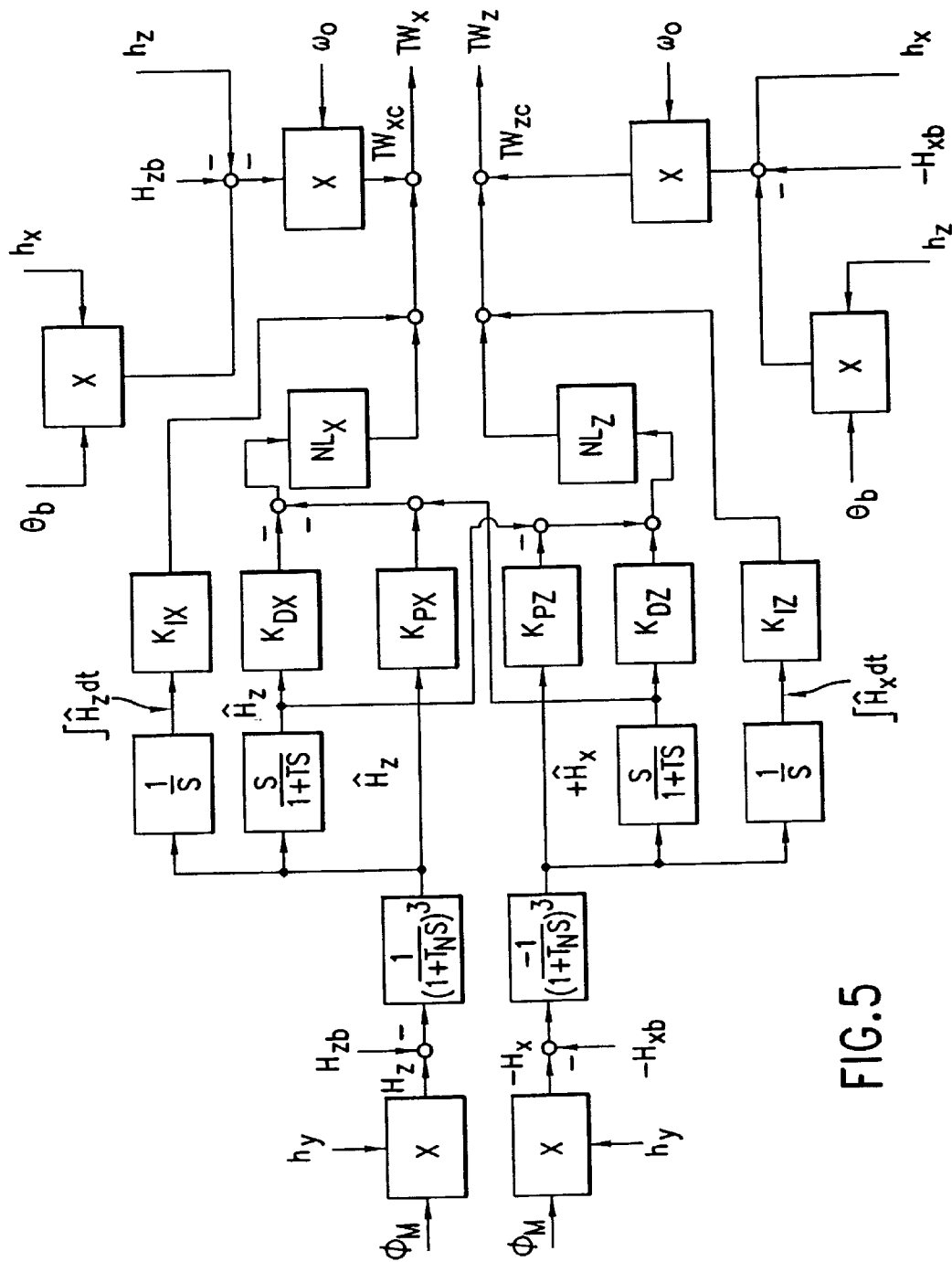
FIG. 5 is a block diagram of a wheel spin controller according to an embodiment of the invention.
Figure 6:
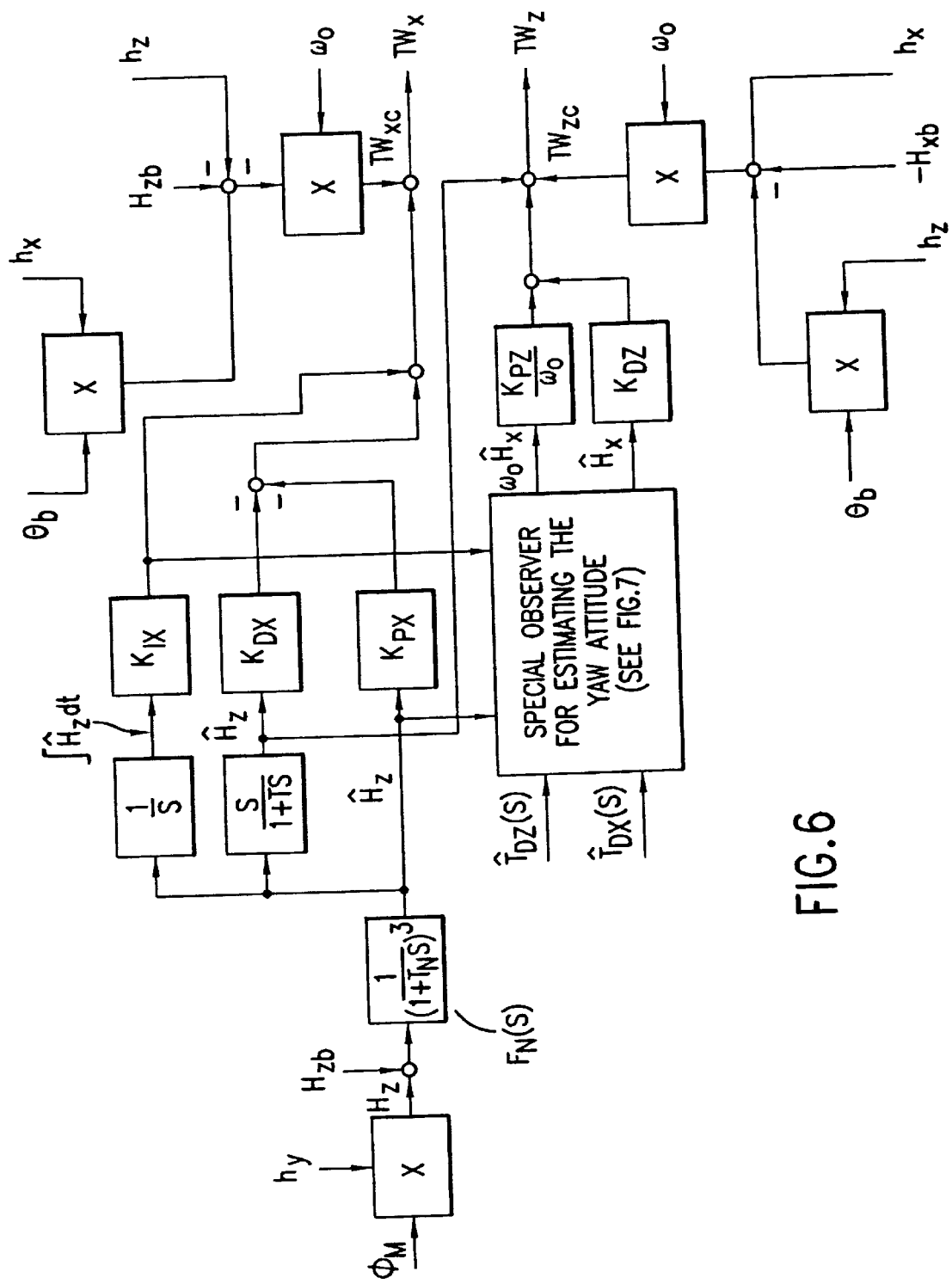
FIG. 6 is a block diagram of a controller according to another embodiment of the invention.

DETAILED DESCRIPTION OF THE DRAWINGS 3.1 Hardware Configuration

An example of the hardware configuration is shown in Illustration 1.
3.1.1 Sensors The normal-operation controller can use earth as well as sun sensors.
3.1.1.1 Earth Sensors The optical axis of the earth sensor extends in parallel to the z-axis of the spacecraft.

3.1.1.2 Arrangement of the Highly Accurate Sun Sensors

Three sun sensor heads provide a full panoramic view around the spaceflight body. The field of sight of the sun sensor arrangement is shown in Illustration 2. It amounts to $0° \leq \alpha \leq 360°$; $-64° \leq \beta \leq 64°$.
3.1.2 Actuators
3.1.2.1 Use of Nozzles In the normal operation, the nozzles are used for despinning only in an emergency.
3.1.2.2 Arrangement of the Spin and Reaction Wheels
3.1.2.2.1 Arrangement for Small Rotations of the Spacecraft and in the Case of a High Spin about the Yaw Axis The arrangement of the spin and reaction wheels of an embodiment according to the invention will be described in the following. The arrangement comprises two spin wheels and two reaction wheels. The spin wheels are inclined symmetrically with respect to the y/z-plane of the spacecraft about the angles $\pm v$ of the y-axis. The inclined spin wheel axes and the y-axis are usually situated in a plane and are rotated about the y-axis about an angle $\eta$. The direction of the spin vector of the reaction wheel is in parallel to the x-axis or to the z-axis (Illustration 3).

Typically, the values for $\eta$ and $v$ are in the range of $0° < \eta < 90°$ or in the range of $0° < v < 90°$. The basic configuration consists of a spin wheel (FMW1 or FMW2) and two reaction wheels. For an emergency, two cases are considered:

a) When one spin wheel fails, the remaining spin wheel and the two reaction wheels are used for the control.

b) When one reaction wheel fails, both spin wheels and the remaining reaction wheel are used for the control.

3.1.2.3 Use of the Solar Wing Control (SADA) as the Actuator

The solar wing control (SADA) is used as an actuator in the nominal operating condition of the normal operation in order to compensate the effects of the environmental torques in the roll/yaw control system.
3.2 Rotary Motion of the Space Missile The Euler equation for the rotary motion of a rigid space missile with spin and reaction wheels relative to the center of gravity is as follows:

$$\underline{h}_s^{(B)} \underline{\omega} \times \underline{h}_s = \underline{T}_C + \underline{T}_D + \underline{T}_G \tag{1}$$

wherein $\underline{h}_S$ is the overall spin of the space missile including the spin wheels about its center of gravity, $\underline{\omega}$ is the absolute angular velocity with the components $$\underline{\omega} = [\omega_x, \omega_y, \omega_z]^T \tag{2}$$

and $\underline{T}_C$, $\underline{T}_D$, $\underline{T}_G$ are external torques which describe the influence of the control, the interference and the center of gravity gradients.

It should be noted that all underlined letters represent vectors in the body system of coordinates, unless described differently;

and the index "(B)" represents a differentiation relative to the body system of coordinates which has its origin in the center of gravity of the body.

The external controller torques originate mainly from two sources $$\underline{T}_C = \underline{T}_{CTH} + \underline{T}_{CSA} \tag{3}$$

wherein $\underline{T}_{CTH}$ is the controller torque generated by the nozzles on the space missile, and $\underline{T}_{CSA}$ is the control torque transmitted by the solar pressure to the solar surfaces.

The overall spin of the space missile in Equation (1) is composed of two parts $$\underline{h}_s = \underline{h}_w + \underline{h}_v \quad (4)$$

wherein $\underline{h}_w$ is the spin in the body system of coordinates stored in the spin wheels, and $\underline{h}_v$ is the spin of the space missile without the spin of the spin wheels.

Under the condition that the body system of coordinates corresponds to the main inertia axes of the space missile, the following applies to the spin of the space missiles:

$$\underline{h}_v = \begin{bmatrix} I_x & 0 & 0 \\ 0 & I_y & 0 \\ 0 & 0 & I_z \end{bmatrix} \cdot \underline{\omega}, \quad (5)$$

wherein $I_x$, $I_y$, $I_z$ are the main inertia torques of the space missile (including the spin wheels) about the main inertial axes. The components of the spin wheel spin in the body system of coordinates are in this case $$h_w = [h_x, h_y, h_z]^T. \quad (6)$$

When the equations (4–6) are used in (1), the following non-linear motion equations about the $x_s$-axis (rolling), $Y_s$-axis (pitching) and the $z_s$-axis (yawing) of the space missile are obtained:

$$\begin{bmatrix} I_x \cdot \dot{\omega}_x + (I_z - I_y) \cdot \omega_y \cdot \omega_z - h_y \cdot \omega_z + h_z \cdot \omega_y + \dot{h}_x \\ I_y \cdot \dot{\omega}_y + (I_x - I_z) \cdot \omega_x \cdot \omega_z - h_x \cdot \omega_z - h_z \cdot \omega_x + \dot{h}_y \\ I_z \cdot \dot{\omega}_z + (I_y - I_x) \cdot \omega_x \cdot \omega_y - h_x \cdot \omega_y + h_y \cdot \omega_x + \dot{h}_z \end{bmatrix} = T_C + T_D + T_G \quad (7)$$

Linearization of the Kinematic Equations

In the following, it is assumed that the space missile is flying in the geostationary orbit and the axes of the satellite system of coordinates ($x_s$, $y_s$, $z_s$) at the start coincide with the orbit reference system of coordinates. The +$z_s$-axis points to the center of the earth; the +$y_s$-axis stands perpendicularly with respect to the equatorial plane pointing to the South; and the +$x_s$-axis points into the flight direction. In addition, it is assumed that the space missile has small initial deflections which are called preadjustment Ruler angles $\psi_b$, $\Theta_b$ and $\phi_b$ about the $z_s$-axis, the $y_s$-axis or the $x_s$-axis of the satellite system or body system.

When starting from its initial position, the space missile is still further deflected by the small Euler angles $\psi$, $\theta$ and $\phi$ the linearized coordinate transformation matrix from the orbit reference system of coordinates to the body system of coordinates is $$L_{S/O} \approx \begin{bmatrix} 1 & \Delta\psi & -\Delta\Theta \\ -\Delta\psi & 1 & \Delta\phi \\ \Delta\Theta & -\Delta\phi & 1 \end{bmatrix}, \quad (8)$$

wherein the following writing was introduced:

$$\Delta\phi = \phi + \phi_b, \Delta\Theta = \Theta + \Theta_b, \text{ und } \Delta\psi = \psi + \psi_b. \quad (9)$$

The angles $\Delta\phi$, $\Delta\Theta$ and $\Delta\psi$ indicated in Equation (9) are assumed to be very small so that the actually non-linear transformation between the orbit reference system of coordinates and the body system of coordinates—the occurring cosine and sine terms were replaced by a or their argument—can be well approximated by the matrix $L_{S/O}$ in Equation (8). The small angular velocities about each axis of the space missile are approximately as large for small attitude angles $\phi$, $\Theta$, $\psi$ and for small preadjustment angular velocities as the Euler angular velocities of the space missile relative to the deflected system of coordinates which was created from the orbit reference system by deflection about the Euler initial angle $\psi_b$, $\Theta_b$, and $\phi_b$; that is, $$\underline{\omega}_r^B \cong [\phi \ \Theta \ \psi]^T, \quad (10)$$

wherein the index B characterizes a vector in the body system of coordinates. In addition, the angular velocity of the space missile must have a component which counteracts the orbit angle velocity $\omega_0$ so that, in the controlled condition, the $z_s$-axis points to the earth; that is, $$\underline{\omega}_o^O = [0 \ -\omega_o \ 0]^T, \quad (11)$$

wherein the index O characterizes a vector in the orbit reference system of coordinates.

After the transformation of $\underline{\omega}_o^O$ in Equation (11) from the orbit reference system into the body system by means of the transformation matrix in Equation (8), the following is obtained for the absolute angular velocity of the space missile:

$$\omega_x \approx \dot{\phi} - \omega_o \cdot \psi - \omega_o \cdot \psi_b$$

$$\omega_y \approx \dot{\Theta} - \omega_o$$

$$\omega_z \approx \dot{\psi} + \omega_o \cdot \phi + \omega_o \cdot \phi_b \quad (12)$$

For small angles and angular velocities, the following approximations can be carried out:

$$\omega_x \cdot \omega_y \approx -\omega_o \cdot \dot{\phi} + \omega_o^2 \cdot \psi + \omega_o^2 \cdot \psi_b$$

$$\omega_x \cdot \omega_z \approx 0$$

$$\omega_y \cdot \omega_z \approx -\omega_o \cdot \dot{\psi} - \omega_o^2 \cdot \phi - \omega_o^2 \cdot \phi_b, \quad (13)$$

and in the case of a constant or slowly changing orbit frequency $\omega_0$ $$\dot{\omega}_x \approx \ddot{\phi} - \omega_o \cdot \dot{\psi} - \omega_o \cdot \dot{\psi}_b$$

$$\dot{\omega}_y \approx \ddot{\Theta}$$

$$\dot{\omega}_z \approx \ddot{\psi} + \omega_o \cdot \dot{\phi} + \omega_o \cdot \dot{\phi}_b. \quad (14)$$

in the case of which the preadjustment angular velocities $\dot{\phi}_b$, $\dot{\Theta}_b$, and $\dot{\psi}_b$ become zero in the end condition.

Linearization of the Motion Equations

The use of the Equations (13, 14) in (7) results in the following linearized motion equations which, however, are still axially coupled with one another:

$$\begin{bmatrix} I_x\ddot{\phi} - [h_y + \omega_o(I_z - I_y)]\omega_o(\phi + \phi_b) - [h_y + \omega_o(I_z - I_y + I_x)]\dot{\psi} + h_z(\dot{\Theta} - \omega_o) + h_x \\ I_y\ddot{\Theta} - h_x\dot{\psi} + h_z\omega_o(\psi + \psi_b) - h_z\dot{\phi} + h_x\omega_o(\phi + \phi_b) + \qquad\qquad h_y \\ I_z\ddot{\psi} - [h_y + \omega_o(I_x - I_y)]\omega_o(\psi + \psi_b) + [h_y + \omega_o(I_z - I_y + I_x)]\dot{\phi} - h_x(\dot{\Theta} - \omega_o) + h_z \end{bmatrix} = \underline{T}_C + \underline{T}_D + \underline{T}_G. \qquad (15)$$

These can be further simplified in that the following quantity estimates are made:

$$h_y \gg \max(I_x\cdot\omega_o, I_y\cdot\omega_o, I_z\cdot\omega_o), \quad \omega_0 \gg \max(|\dot{\phi}|, |\dot{\Theta}|, |\dot{\psi}|) \qquad (16)$$

all terms with $\dot{h}_x$ or $\dot{h}_z$, which are multiplied with a small angle or a small angle velocity, are neglected;

all terms with $\dot{h}_y$, which are multiplied with a small angle, are neglected;

it is assumed that the components of $\underline{T}_0$ are also negligible.

As a result, the motion equations (15) are further simplified:

$$I_x\cdot\ddot{\phi} - h_y\cdot\omega_o\cdot\phi - h_y\cdot\dot{\psi} - h_z\cdot\omega_o - h_y\cdot\omega_o\cdot\phi_b + \dot{h}_x \approx T_{cx} + T_{dx} \qquad (17)$$

$$I_y\cdot\ddot{\Theta} + (h_z\cdot\omega_o\cdot\psi_b + h_x\cdot\omega_o\cdot\phi_b) + \qquad \dot{h}_y \approx T_{cy} + T_{dy}$$

-continued $$I_z\cdot\ddot{\psi} - h_y\cdot\omega_o\cdot\psi + h_y\cdot\dot{\phi} + h_x\cdot\omega_o - h_y\cdot\omega_o\cdot\psi_b + \dot{h}_z \approx T_{cz} + T_{dz}$$

Linearization of the Notion Equations for the Controller Design

The controller attempts to hold the spin of the space missile inertially constant; that is, that the spin vector remains in the same direction with the orbit angular velocity vector despite rotary motions of the space missile.

Therefore, the following spin set should be used in the orbit reference system of coordinates:

$$+e,\!dot\,\underline{h} + ee_{\,o}^{(o)} + \underline{\omega}_o \times \underline{h}_o = \underline{T}_C^{\,o} + \underline{T}_D^{\,o} + \underline{T}_G^{\,o}, \qquad (18)$$

wherein the torques on the right side of Equation (18) are now indicated relative to the orbit reference system. The terms in Equation (18) are obtained as follows:

$\underline{\omega}_0$ is defined in Equation (11)

$$\underline{h}_o = L_{o/s}\cdot\underline{h}_s \qquad (19)$$

with $$L_{o/s} = L_{s/o}^{\,T} \qquad (20)$$

and $$\underline{h}_s = [(I_x\cdot\omega_x + h_x), (I_y\cdot\omega_y + h_y), (I_z\cdot\omega_z + h_z)]^T. \qquad (21)$$

Therefore, after Equations (20, 21) are used in Equation (19), the following is obtained:

$$\underline{h}_o = \begin{bmatrix} (I_x\cdot\omega_x + h_x) - (I_y\cdot\omega_y + h_y)\cdot\Delta\psi + (I_z\cdot\omega_z + h_z)\cdot\Delta\Theta \\ (I_x\cdot\omega_x + h_x)\cdot\Delta\psi + (I_y\cdot\omega_y + h_y) - (I_z\cdot\omega_z + h_z)\cdot\Delta\phi \\ -(I_x\cdot\omega_x + h_x)\cdot\Delta\Theta + (I_y\cdot\omega_y + h_y)\cdot\Delta\phi + (I_z\cdot\omega_z + h_z) \end{bmatrix}. \qquad (22)$$

The use of Equation (22) in Equation (18) results by means of the usual approximations for small angles and angular velocities in the following steady-state condition:

$$I_x\cdot\dot{\omega}_x - h_y\cdot\omega_o\cdot\Delta\phi - h_y\cdot\Delta\dot{\psi} - h_z\cdot\omega_o + h_x\cdot\omega_o\cdot\Delta\Theta + \dot{h}_x \approx T_{cx}^{\,o} + T_{dx}^{\,o} \qquad (23)$$

$$I_y\cdot\dot{\omega}_y + \qquad \dot{h}_y \approx T_{cy}^{\,o} + T_{dy}^{\,o}$$

$$I_z\cdot\dot{\omega}_z - h_y\cdot\omega_o\cdot\Delta\psi + h_y\cdot\Delta\dot{\phi} + h_x\cdot\omega_o - h_z\cdot\omega_o\cdot\Delta\Theta + \dot{h}_z \approx T_{cz}^{\,o} + T_{dz}^{\,o}.$$

The roll-yaw dynamics are now uncoupled from the pitch dynamics. Finally, Equations (9, 14) are used in Equation (23) and for the spin wheel controller torques the following writing is introduced $$\underline{T}_w = [-\dot{h}_x, -\dot{h}_y, -\dot{h}_z]^T \qquad (24)$$

so that the motion equations of the system to be controlled will be $$I_x\cdot\ddot{\phi} - h_y\omega_o\cdot\phi - h_y\cdot\dot{\psi} - (-\Theta_b h_x + \phi_b h_y + h_z)\cdot\omega_o \approx T_{wx} + T_{cx}^{\,o} + T_{dx}^{\,o} \qquad (25)$$

$$I_y\cdot\ddot{\Theta} \qquad \approx T_{wy} + T_{cy}^{\,o} + T_{dy}^{\,o}$$

$$I_z\cdot\ddot{\psi} - h_y\omega_o\cdot\psi + h_y\cdot\dot{\phi} + (h_x - \psi_b h_y + \Theta_b h_z)\cdot\omega_o \approx T_{wz} + T_{cz}^{\,o} + T_{dz}^{\,o}.$$

3.3 Derivation of the Reduced Observer for the Yaw Angle Determination 3.3.1 Observer Equations During the eclipse and in the collinearity region, the yaw angle cannot be determined from measurements of optical sensors. In these cases, the yaw angle is estimated by means of a yaw angle observer in which only the roll angle is entered as the measurable quantity. The yaw angle observer is based on the linearized system equations for the roll and yaw motion in the orbit reference system of coordinates (Equation (25)):

$$I_x\cdot\ddot{\phi} - h_y\omega_o\cdot\phi - h_y\cdot\dot{\psi} - (-\Theta_b h_z + \phi_b h_y + h_z)\cdot\omega_o = T_{wx} + T_{cx} + T_{dx} \qquad (26a)$$

$I_z \cdot \ddot{\psi} - h_y \omega_o \cdot \dot{\psi} + h_y \cdot \dot{\phi} + (h_z - \psi_b h_y + \Theta_b h_z) \cdot \omega_o = T_{wz} + T_{cz} + T_{dz}.$ (26b)

The terms $(-\Theta_b h_x + \phi_b h_y + h_z) \cdot \omega_o$ and $(h_x - \psi_b h_y + \Theta_b h_z) \cdot \omega_o$ contain parameters and variables which are either known or can be measured. For this reason, they can be compensated by spin wheel controller torques and therefore disappear from the system equations.

The spin wheel controller torques are divided into $T_{wx} = T_{wxc} + T_{wxac}$ (27a)

$T_{wz} = T_{wzc} + T_{wzac}$ (27b)

and for T? and T?, the corresponding compensation terms are used:

$T_{wxc} = (-\Theta_b h_x + \phi_b h_y + h_z) \omega_o$ (28a)

$T_{wzc} = (h_x - \psi_b h_y + \Theta_b h_z) \omega_o.$ (28b)

The observer is now based on the following simplified equations:

$I_x \cdot \ddot{\phi} - \omega_0 \cdot h_y \cdot \dot{\phi} - h_y \cdot \dot{\psi} = T_{wxac} + T_{cx} + T_{dx}$ (29a)

$I_z \cdot \ddot{\psi} - \omega_0 \cdot h_y \cdot \dot{\psi} + h_y \cdot \dot{\phi} = T_{wzac} + T_{cz} + T_{dz}.$ (29b)

The following condition variables are introduced:

$H_z = -h_y \cdot \dot{\phi}$ (30a)

$H_x = h_y \cdot \dot{\psi},$ (30b)

so that the system equations (Equation (26)) can be written as follows:

$-(I_x/h_y) \cdot \ddot{H}_z + \omega_0 \cdot H_z - \dot{H}_x = T_{wxac} + T_{cx} + T_{dx}$ (31a)

$(I_z/h_y) \cdot \ddot{H}_x - \omega_0 \cdot H_x - \dot{H}_z = T_{wzac} + T_{cz} + T_{dz}.$ (31b)

if it is assumed that $\Omega_{Nx} = h_z/I_z$ (32a)

and $\Omega_{Nx} = h_y/I_z.$ (32b)

If $I_z$ and $I_x$ are approximately equal, the following applies $\Omega_N = \Omega_{Nx} = \Omega_{Nz},$ (32c)

so that Equation (29) can be written as follows:

$\ddot{H}_z = \omega_0 \cdot \Omega_N \cdot H_z - \Omega_N \cdot \dot{H}_x - \Omega_N (T_{wxac} + T_{cx} + T_{dx})$ (33a)

$\ddot{H}_z = \omega_0 \cdot \Omega_N \cdot H_z + \Omega_N \cdot \dot{H}_z + \Omega_N (T_{wzac} + T_{cz} + T_{dz}).$ (33b)

$H_z$ is proportional to the roll angle and can be measured. Therefore the derivation can also be calculated. The coefficient $\Omega_N$ is also known so that the term "$\Omega_N \cdot H_z$" from Equation (33b) can be compensated if the controller torques are selected correspondingly.

By means of this compensation, the inherent values of the above system move from $\pm j\omega_0$, $\pm j\Omega_N$ to $\pm j\sqrt{(\omega_g \cdot \Omega_N)_s} \pm j\sqrt{(\omega_0 \cdot \Omega_N)}$.

Using the conditions vector $\underline{x} = [H_z, \dot{H}_z, H_x, \dot{H}_x]^T$ (34)

the following can be written for Equation (33):

$$\begin{vmatrix} \dot{H}_z \\ \ddot{H}_z \\ \dot{H}_x \\ \ddot{H}_x \end{vmatrix} = \begin{vmatrix} 0 & 1 & 0 & 0 \\ \omega_0 \Omega_N & 0 & 0 & -\Omega_N \\ 0 & 0 & 0 & 1 \\ 0 & 0 & \omega_0 \Omega_N & 0 \end{vmatrix} \cdot \begin{vmatrix} H_z \\ \dot{H}_z \\ H_x \\ \dot{H}_x \end{vmatrix} +$$

$$\begin{vmatrix} 0 & 0 \\ -\Omega_N & 0 \\ 0 & 0 \\ 0 & \Omega_N \end{vmatrix} \cdot \begin{vmatrix} T_{wxac} + T_{cx} + T_{dx} \\ T_{wzac} + T_{cz} + T_{dz} \end{vmatrix}$$ (35)

3.3.2 Testing the Observability

In order to increase the sensitivity of the observer with respect to environmental torques, not $H_z$ but $\int H_z \, dt$ is supplied to the observer as the measurable quantity. The system equations with the expanded condition vector therefore become:

$\underline{x} = \left[ \int H_z dt \quad H_z \quad \dot{H}_z \quad H_x \quad \dot{H}_x \right]^T$ (34)

$$\begin{vmatrix} \dot{H}_z \\ \dot{H}_z \\ \ddot{H}_z \\ \dot{H}_x \\ \ddot{H}_x \end{vmatrix} = \begin{vmatrix} 0 & 1 & 0 & 0 & 0 \\ 0 & 0 & 1 & 0 & 0 \\ 0 & \omega_0 \Omega_N & 0 & 0 & -\Omega_N \\ 0 & 0 & 0 & 0 & 1 \\ 0 & 0 & 0 & \omega_0 \Omega_N & 0 \end{vmatrix} \cdot \begin{vmatrix} \int H_z dt \\ H_z \\ \dot{H}_z \\ H_x \\ \dot{H}_x \end{vmatrix} +$$

$$\begin{vmatrix} 0 & 0 \\ 0 & 0 \\ -\Omega_N & 0 \\ 0 & 0 \\ 0 & \Omega_N \end{vmatrix} \cdot \begin{vmatrix} T_{wx} + T_{cx} + T_{dx} \\ T_{wz} + T_{cz} + T_{dz} \end{vmatrix}$$ (35)

The pertaining measuring equation is:

$\underline{y} = [1 \ 0 \ 0 \ 0 \ 0] \cdot \underline{x},$ (36)

so that the following is obtained for the observability matrix:

$$c = \begin{vmatrix} 1 & 0 & 0 & 0 & 0 \\ 0 & 1 & 0 & \omega_0 \Omega_N & 0 \\ 0 & 0 & 1 & 0 & \omega_0 \Omega_N \\ 0 & 0 & 0 & 0 & -\omega_0 \Omega_N^2 \\ 0 & 0 & 0 & -\Omega_N & 0 \end{vmatrix}$$ (37)

The observability matrix is fully ranked. The system with measurable quantity $\int H_z dt$ is therefore observable.

3.4 Derivation of the Controller Equations for the Normal Condition

3.4.1 Controller Component for Uncoupling the Path Movement

The fundamental equations in Equation (33) are used as the basis:

$$H_z - \omega_0 \cdot \Omega_N \cdot H_z + \Omega_N \cdot H_x = -\Omega_N(T_{wxac} + T_{cx} + T_{dx}) \quad (38a)$$

$$H_x - \omega_0 \cdot \Omega_N \cdot H_x - \Omega_N \cdot H_z = \Omega_N(T_{wzac} + T_{cz} + T_{dz}). \quad (38b)$$

$$\Omega_N = \frac{h_y}{\sqrt{I_x I_z}} \to \text{sign}\, h_y = -1 \quad (38c)$$

In order to dampen the flexibility of the solar generator and suppress a measuring noise, an additional filter is required for the measurable quantity. A typical block diagram for the controller is shown in Illustration 5. In it, the desired value for the roll angle and the yaw angle was already subtracted.

3.4.2 Two-Axis Measurement (Rolling, Yawing)

One PDI-controller respectively is used as the controller for the x-axis and the z-axis:

$$T_{WKAC} = -[K_{ps} \cdot H_s^o + K_{Dz} \cdot \dot{E}_s^o] \cdot f_{Nlx} - K_{fz} \int H_s^o dt - \dot{E}_z^o \quad (40a)$$

$$T_{WKAC} = [K_{ps} \cdot H_z^o + K_{Dz} \cdot \dot{H}_s^o] \cdot f_{Nla} + K_{fs} \int H_g^o dt + \dot{H}_g^o \quad (40b)$$

*Filtered signal or originating from roll and yaw measurement

By means of the above controller equations, the following closed transmission functions are obtained if Equations (38, 40) are Laplace-transformed and Equation (38) is used in Equation (40). (non-linearities in Illustration 5 are not taken into account; that is $f_{NLx} = f_{NLs} = 1$):

$$H_z = \frac{s \cdot (T_{cx} + T_{dx})}{\left|\frac{I_x}{h_y}\right| s^3 + K_D s^2 + (K_p + \omega_0)s + K_I} \quad (41a)$$

$$H_x = \frac{-s \cdot (T_{cz} + T_{dz})}{\left|\frac{I_z}{h_y}\right| s^3 + K_D s^2 + (K_p + \omega_0)s + K_I} \quad (41b)$$

wherein $K_{Dk} = K_{Dx} = K_{D1} K_{PM} = K_{Pz} = K_{P1} K_{ix} = K_{iz} = K_I$.

For the integrated condition quantities $H_z$ and $H_x$, the following will apply after the integration in the Laplace range:

$$\text{INT}(H_z) := K_I \int H_z^* dt = \frac{(T_{cx} + T_{dx})}{T_3^3 s^3 + T_2^2 s^2 + T_1 s + 1} \quad (42a)$$

$$\text{INT}(H_x) := K_I \int H_x^* dt = \frac{(T_{cz} + T_{dz})}{T_3^3 s^3 + T_2^2 s^2 + T_1 s + 1} \quad (42b)$$

Assuming that the controller bandwidth is much larger than the orbit environmental torques, the following approximations can be made:

$$H_z = \frac{1}{K_I} \cdot (\dot{T}_{dx} + \dot{T}_{cx}) \quad (43a)$$

$$H_x = \frac{1}{K_I} \cdot (\dot{T}_{dz} + \dot{T}_{cz}) \quad (43b)$$

$$(T_{dx} + T_{cx}) = \text{INT}(H_z) \quad (43c)$$

$$(T_{dz} + T_{cz}) = \text{INT}(H_x) \quad (43d)$$

3.4.3 Single-Axis Measurement (Rolling) and Yaw Observer

A case is assumed in which $H_x$ and $H_z$ (Equation (28b)) cannot be measured. The back-coupled roll angle is supplied as the measurable quantity to the yaw observer, which roll angle contains information concerning the yaw velocity and from which then, by the corresponding selection of the observer parameter $\underline{h}$, the yaw attitude and the yaw velocity can be estimated. For a better understanding, the transmission function of the closed roll control circuit should be observed. It is obtained by using the controller torque T? from Equation (40a) (without the uncoupling component H? which is assumed to be unmeasurable) in Equation (38a) and the Laplace transformation:

$$H_z(s) = \frac{-s\Omega_{Nx}(-sH_x - T_{Dx}^*)}{[s^3 - \Omega_{Nx}[K_{Dx}s^2 + (K_{Px} + \omega_0)s + K_{Ix}]}, \quad (44a)$$

in which case an abbreviating writing method $$T_{Dx}^* = T_{dx} + T_{cx}, \quad (44b)$$

$$T_{Dx}^* = T_{dz} + T_{cz} \quad (44c)$$

$$\tilde{T}_{Dx} = T_{Dx}^* - \hat{T}_{Dx}, \quad (44d)$$

$$\tilde{T}_{Dx} = T_{Dx}^* - \hat{T}_{Dz}, \quad (44e)$$

was introduced.

As the measurable quantity, the signal $$y = -K_{Ix}\left(\frac{1}{s} \cdot H_z + K_0 \cdot H_z\right) = \frac{K_I}{s} \cdot H_z(1 + K_0 s) \quad (44f)$$

is used which can be considered as a filtered yaw angle signal. Placing Equation (44a) in Equation (44f), the following is obtained $$y = \frac{-K_{Ix}(1 + K_0 s) \cdot \Omega_{Nx}}{[s^3 - \Omega_{Nx}[K_{Dx}s^2 + (K_{Px} + \omega_0)s + K_{Ix}]}(sH_x + T_{Dx}^*) = \quad (44g)$$

$$F(s)(-sH_x - T_{Dx}^*)$$

3.4.3.1 Spin Wheel Control Torques

The control torques T? and T? in Equation (28a, b) remain unchanged because no yaw information is entered into them. As mentioned above, the roll angle control torque T? in Equation (40a) no longer contains any uncoupling component $H_z$; that is $$T_{wxac} = -[K_{Px}H_z^* + K_{Dx}\dot{H}_z^*]f_{NLx} - K_{Ix}\int H_z^* dt \quad (45a)$$

The yaw angle control torque T? consists of two parts, $$T_{wzac} = T_{wzD} + T_{wzO}, \quad (45b)$$

wherein T? indicated the uncoupling component from the roll dynamics to the yaw dynamics, $$T_{wzD} = -\dot{H}_z^*, \quad (45c)$$

and T? is the control signal formed by means of the yaw observer $$T_{wzO} = \underline{k}^T \hat{\underline{x}}. \quad (45d)$$

3.4.3.2 Yaw Attitude Controller

By means of the new condition quantities $$x_1 = \omega_0 H_x \quad (46a)$$

$$x_2 = \dot{H}_x \quad (46b)$$

Equation (38b) can be written as follows:

$$\dot{\underline{x}} = A \cdot \underline{x} - \underline{b}\underline{k}^T \hat{\underline{x}} + \underline{b}T_{Dz}^* \quad (47a)$$

with $$A = \begin{bmatrix} 0 & \omega_0 \\ -\Omega_{N0} & 0 \end{bmatrix}, \quad \underline{b} = \begin{bmatrix} 0 \\ \Omega_{N0} \end{bmatrix} \quad (47b, c)$$

and written as $$\Omega_{N0} = |\Omega_N|. \quad (47d)$$

From Equation (46a, b), the relationship $$x_2 = x_1/\omega_0 \quad (47e)$$

is immediately obtained.

For the observer, the following structure is set $$\dot{\hat{\underline{x}}} = A \cdot \hat{\underline{x}} - \underline{b}\underline{k}^T \hat{\underline{x}} + \underline{h}(y - \hat{y}) + \underline{b} \cdot \hat{T}_{Dz} \quad (48a)$$

with $$y = F(s)(sH_x - T_{Dx}^*) = F(s) \cdot (\underline{c}^T \cdot \underline{x} - T_{Dx}^*) \quad (48b)$$

and $$\hat{y} = \hat{F}(s) \, (\underline{c}^T + e, cir \, \underline{x} + ee - \hat{T}_{Dx}) \quad (48c)$$

$$\underline{c}^T = [0 \; 1], \quad \underline{k}^T = [k_1, k_2]. \quad (48d, e)$$

The observer vector $\underline{h}$ contains the observer parameters $h_1$ and $h_2$ to be selected $$\underline{h}^T = [h_1, h_2]. \quad (48f)$$

From the above equations, the estimation error can be calculated as follows:

$$s\underline{x} = [A\underline{x} - \underline{hc}^T \cdot F(s)]\underline{x} + \underline{hc}^T F(s)\underline{x} - \underline{bk}^T \hat{\underline{x}} + \underline{b}T_{Dz}^* \quad (49a)$$

$$s\hat{\underline{x}} = [A\hat{x} - \underline{hc}^T \cdot \hat{F}(s)]\hat{\underline{x}} + \underline{hc}^T \hat{F}(s)\underline{x} - \underline{bk}^T \hat{\underline{x}} - \underline{h} \cdot F(s)T_{Dx}^* + \underline{h}\hat{F}(s)\hat{T}_{Dx} + \underline{b}\hat{T}_{Dz} \quad (49b)$$

The following also applies $$F(s) \approx \hat{F}(s); \quad F_{ss} = \hat{F}_{ss} = 1 \quad (49c)$$

and for s→0

$$F(s) = \hat{F}(s)$$

For the estimation error, the following will then apply:

$$s\tilde{\underline{x}} = [A - \underline{hc}^T \hat{F}(s)]\tilde{\underline{x}} + \underline{b}(T_{Dz}^* - \hat{T}_{Dz}) + \underline{h}\hat{F}(s)(T_{Dx}^* - \hat{T}_{Dx}) \quad (49d)$$

$$\tilde{\underline{x}} = [sE - A + \underline{hc}^T \hat{F}(s)]^{-1} [\underline{b}\tilde{T}_{Dx} + \underline{h}\hat{F}(s)\tilde{T}_{Dz}] \quad (49e)$$

$$F_{ss} = |F(jw_{ss})| = |\hat{F}(jw_{ss})| = 1; \; 0 < \omega_{ss} \leq \omega_{Beobachter}$$

written as $$\tilde{T}_{Dx} = T_{Dx}^* - \hat{T}_{Dx} \quad (49f)$$

$$\tilde{T}_{Dz} = T_{Dx}^* - \hat{T}_{Dz}. \quad (49g)$$

Finally by using the Equations (39 c, d) and (45 a, b) in (39 a, b) for the controller torques for controlling the roll and yaw dynamics, the following is obtained:

$$T_{wx} = -(-\theta_b \cdot h_x + \phi_b h_y + h_z) \cdot \omega_0 \cdot \Omega_N - [K_{Px} H_z^* + K_{Dx} \dot{H}_z^* + K_{Ix} \int H_z^* dt] \quad (49h)$$

$$T_{wz} = (\theta_b \cdot h_z + \psi_b h_y + h_x) \cdot \omega_0 \cdot \Omega_N + \dot{H}_z^* + \underline{k}^T \cdot + e, cir \, \underline{x} + ee \quad (49i)$$

Illustrations 6 and 7 show a block diagram for the spin wheel control and a block diagram for the observer.
Stability:

Equations (49a) and (49d) indicate $$s\underline{x} = [A - \underline{bk}^T]\underline{x} + \underline{bk}^T \tilde{\underline{x}} + \underline{b}T_{Dz}^* \quad (50a)$$

$$s\tilde{\underline{x}} = [A - \underline{hc}^T \hat{F}(s)]\tilde{\underline{x}} + \underline{b} \cdot \tilde{T}_{Dx} + \underline{h} \cdot \hat{F}(s) \cdot \tilde{T}_{Dz} \quad (50b)$$

$$\begin{bmatrix} sE - A + \underline{bk}^T & -\underline{bk}^T \\ 0 & sE - A + \underline{hc}^T \cdot \hat{F}(s) \end{bmatrix} \begin{bmatrix} \underline{x} \\ \tilde{\underline{x}} \end{bmatrix} = \begin{bmatrix} \underline{b}T_{Dz}^* \\ \underline{b}\tilde{T}_{Dx} + \underline{h}\hat{F}(s) \cdot \tilde{T}_{Dz} \end{bmatrix} \quad (50c)$$

Stability of the back-coupled system is guarantied when the characteristic equation det A?)S)=0 has only zero positions in a positive real part.

According to Equation (50c), the following applies to the characteristic equation:

$$\det A_d = \deg(aE - A + \underline{bk}^T) \cdot \det(aE - A + \underline{bc}^T \cdot F(s)). \quad (50d)$$

This demonstrates that, also by means of this special observer, the separation principle remains valid; that is, the influence of the yaw controller and of the yaw observer on the stability of the back-coupled system are independent of one another. However, the back-coupled transmission function of the roll control circuit (F(S)) influences the observer parameters and the stability behavior.

The controller in the roll control loop must be designed such that the control dynamics do not interfere with the observer. Typically the bandwidth of the roll control circuit is approximately by a factor 10 larger than the observer bandwidth.

The dynamics of the environmental torques in the normal operation are very slow because the environmental torques consist mainly of constants or sine terms of the frequency $\omega_o$ and $2\omega_o$. However, in the low, frequency range $|F(j\omega)| \approx 1$ applies so that in the normal operation the influence of the dynamics of the roll control circuit on the yaw precision and the control quality is negligible.

3.4.3.3 Estimation Errors because of Environmental Torques

The following approximations are carried out:

$$|F(j\omega)| \approx 1 \; für \; 0 \leq \omega \leq \omega_y; \quad (51a)$$

$$T_{Dx}(j\omega) \approx 0, \, T_{Dz}(j\omega) \approx 0 \; für \; \omega > \omega_y \quad (51b)$$

The placing of Equation (51a) in Equation (50b) and matrix manipulations result in the following:

$$\tilde{x} = \frac{\begin{bmatrix} h_z + s & -(h_1 - \omega_0) \\ \Omega_{NO} & s \end{bmatrix} \left( \begin{bmatrix} h_1 \\ h_2 \end{bmatrix} \tilde{T}_{Dx} + \begin{bmatrix} 0 \\ \Omega_{NO} \end{bmatrix} \tilde{T}_{Dz} \right)}{s^2 + h_2 - h_1 \Omega_N + \omega_0 \Omega_N} \quad (52a)$$

$$\tilde{x}_1 = \frac{(h_1 \cdot s + \omega_0 h_2) \tilde{T}_{Dx} + (-\Omega_{NO} h_1 + \omega_0 \Omega_{NO}) \tilde{T}_{Dz}}{s^2 + h_2 s - h_1 \Omega_{NO} + \omega_0 \Omega_{NO}} \quad (52b)$$

$$\tilde{x}_2 = \frac{(h_1 \Omega_{NO} + s h_2) \tilde{T}_{Dx} + \Omega_N \cdot s \tilde{T}_{Dz}}{s^2 + h_2 s - h_1 \Omega_{NO} + \omega_0 \Omega_{NO}} \quad (52c)$$

The environmental torques $\tilde{T}_{Dx}$ and $\tilde{T}_{Dz}$ are calculated from the Equations (44 b, c, d e).

3.4.3.4 Estimating the Yaw Attitude Error and the Yaw Velocity Error

According to Equation (50a), the following is obtained for the condition $\underline{x}$ after a Laplace transformation:

$$\underline{x} = \frac{\begin{bmatrix} s + k_2 \Omega_{NO} & \omega_0 \\ -\Omega_{NO}(1 + k_1) & s \end{bmatrix} \left( \begin{Bmatrix} 0 \\ \Omega_{NO}(k_1 \tilde{x}_1 + k_2 \tilde{x}_2) \end{Bmatrix} + \begin{Bmatrix} 0 \\ \Omega_{NO} \cdot T^*_{Dz} \end{Bmatrix} \right)}{s^2 + k_2 \Omega_N s + \omega_0 \Omega_N (1 + k_1)} \quad (53a)$$

$$x_1 = \frac{\omega_0 \Omega_{NO}(k_1 \tilde{x}_1 + k_2 \tilde{x}_2 + T^*_{Dz})}{s^2 + k_2 \Omega_{NO} s + \omega_0 \Omega_{NO}(1 + k_1)} \quad (53b)$$

In this case, the following applies to the orbit frequency $\omega_s = 7.27 \cdot 10^{-4}$ 1/s and for the components of the condition vector return $$k_1 = 1/\omega_0 \cdot k_p; \; k_p \approx K_P \quad (53c)$$

$$k_2 = k_d; \; k_d \approx K_D. \quad (53d)$$

If the components are selected such that $k_1 >>$ and $k_1 >> k_2$, the following is obtained for the steady-state values of $x_1$ and $x_3$, $$x_1 = \frac{k_1}{1 + k_1} \tilde{x}_1 + \frac{k_2}{1 + k_1} \tilde{x}_2 + \frac{T^*_{DZ}}{1 + k_1} \quad (54a)$$

and for very large values of $k_1$ $$x_1 = \tilde{x}_1 \quad (54b)$$

and therefore also $$\dot{x}_1 = \dot{\tilde{x}}_1. \quad (54c)$$

Because of Equation (47c), the following will then apply $$x_2 = \tilde{x}_2. \quad (54d)$$

Equations (54c, d) show that attitude and angular velocity errors can be estimated by their estimation errors.

3.4.3.5 Prediction of the Roll and Yaw Environmental Torques without External Control Torques The control quality of the roll control circuit while taking into account Equation (44a) for small values of $s = j\omega$ and retransformation into the time range can be $$H_s = \phi \cdot |h_y| \approx 1/K_f (\tilde{T}_{dx} + \dot{H}_K) < 1 - \phi \approx 0° \quad (55a)$$

In this case, it is assumed that $K_f$ is larger than the amplitude of the interfering torque $t_{dx}$.

3.4.3.5.1 Yaw Errors in Collinearity Regions in the Case of Environmental Torque Estimation and Prediction In front of and behind this region, roll and yaw angle measurements are available. Equations (43 c, d) show that the unknown environmental torques can simply be estimated by the integration of the quantities $H_z$ and $H_z$ which are assumed to be known.

In the following, a process is introduced for the estimation, prediction and compensation of the environmental torques by means of which attitude errors in the collinearity regions can be further corrected.

The regions are-well known and can be determined by means of an on-board computer. The processes is divided into four phases.

In phases 1 and 3, the roll and yaw angle are known. By means of Equations (43a–d), the environmental torques and their derivations can be determined very precisely. In phase 2, which takes approximately ⅛ of the period (24 h-day), a switch-over takes place to the special yaw observer for the yaw angle control circuit (see Section 3.4.3). Then the environmental torques in the model are reduced by the estimated component by means of time-dependent functions whose derivation will now be described.

Phases 1a, 3a are short transition phases from the yaw estimation to the yaw measuring and vice versa. The environmental torque estimation begins when a steady-state condition is reached.

An example for the simple time-dependent function for the environmental torque estimation is the polynomial of the 2nd order $$\tilde{T}_0 \cdot (\Delta t) = A_0 + B_0 \cdot \Delta t + C_0 \cdot \Delta t^2 \; mit \; \Delta t = t - t_1 \quad (55b)$$

For $t_1 \leq t \leq t_3$, $A_0$, $B_0$ and $C_0$ are coefficients to be determined which are calculated from known function values:

$$A_0 = \overline{T}_{Di}(t_1) \quad (55c)$$

$$B_0 = \dot{\overline{T}}_{Di}(t_1) \quad (55d)$$

$$C_0 = \frac{T^*_{Di}(t_3) - \overline{T}_{Dz}(t_1)}{(t_3 - t_1)^2} - \frac{\dot{\overline{T}}_{Di}(t_1)}{(t_3 - t_1)} \quad (55e)$$

The values $$T_{Di}(t_1), \dot{\overline{T}}_{Di}(t_1), T_{Di}^*(t_3), i = x, z,$$

can be derived from Equations (43a–d). At first, it seems to present problems to be able to determine the value of $T_{Di}(t_3)$ before the satellite leaves the collinearity region. However, assuming that the changes of the disturbance are small from one day to the next (lower than 3%), the value $T_{Di}(t_3)$ from the previous day can be used for the prediction algorithm, $$T^*_{Di}(t_3) = T_{Di}(t_3 - 1 \; day) \quad (56)$$

Using the observer parameters $h_1 = 0$, $h_2 = h_2^\circ \cdot \Omega_{ND}$, the following is obtained from Equation (54b) for the steady-state yaw angle error $$\psi(t) = \left(h_2^* \cdot (T_{dx}(t) - \hat{T}_{Dx}(t)) + (T_{dz}(t) - \hat{T}_{Dz}(t))\right) \cdot \frac{57.3°}{|h_y| \cdot \omega_0} \quad (57)$$

The precision of the yaw angle error can be improved in the collinearity regions by a factor 3–5.

3.4.3.5.2 Yaw Error in Collinearity Regions without Any Environmental Torque Estimation and Prediction In this case, a yaw angle error of $$\psi(t) = \left[\frac{h_2}{\Omega_{NO}} \cdot T_{dx}(t) + T_{dz}(t)\right] \cdot \frac{57.3°}{|h_y| \cdot \omega_0} \quad (58)$$

is obtained directly from Equation (54b).

3.4.4 Estimation of the Roll and Yaw Control Quality Using External Control Torques for the Spin Discharge 3.4.4.1 Roll and Yaw Measurement From Equations (24, 39) it is known that the following applies to the spin wheel torques:

$$T_{wx} = -\dot{h}_x = T_{wxc} + T_{wxac} \quad (59a)$$

$$T_{wz} = -\dot{h}_z = T_{wzc} + T_{wzac}. \quad (59b)$$

It is technically not possible to keep the spin wheel torques constant during the duration of the mission because otherwise the speed of the spin wheels would go toward the infinite. For this reason, the spin wheels are "discharged"; that is, the spin wheel torques are moved to zero by way of an external slower control circuit. In the following, the system equations required for this purpose will be derived.

In the steady-state controlled condition, the following relationships apply $$|H_z|, |H_x| \ll 1, |H_z|, |H_x| \ll |H_z|, |H_x| = 0, \quad (60a)$$

as well as the Equations (43 c, d); that is, $$\text{INT}(H_z) = T_{dx} + T_{cx} \quad (60b)$$

$$\text{INT}(H_x) = -(T_{dz} + T_{cz}). \quad (60c)$$

The placing of Equation (60) in Equations (39c, d) and (40a, b) results in the system equations of the spin wheels in the x- and z-direction $$\dot{h}_z - \omega_0(h_z + \phi_b h_y - \Theta_b h_x) = T_{dx} + T_{cx} \quad (61a)$$

$$\dot{h}_x - \omega_0(h_x + \psi_b h_y - \Theta_b h_z) = T_{dz} + T_{cz} \quad (61b)$$

The external spin discharge control torques are returned proportionately to the wheel spin:

$$T_{cx} = -K_g h_x \quad (61c)$$

$$T_{cz} = -K_g h_z \quad (61d)$$

The transformation of Equations (61a, b) into the s-range results in:

$$\begin{bmatrix} h_x \\ h_z \end{bmatrix} = \frac{\begin{bmatrix} s + K_z + \omega_0\theta_B & +\omega_0 \\ -\omega_0 & s + K_x + \omega_0\theta_B \end{bmatrix}\begin{bmatrix} T_{dx}(s) \\ T_{dz}(s) \end{bmatrix} + \begin{bmatrix} \phi_b \cdot h_y \cdot \omega_0 \\ \psi_b \cdot h_y \cdot \omega_0 \end{bmatrix}}{s^2 + (K_x + K_z + 2\omega_0\theta_B)s + \omega_0^2 + (K_x + \omega_0\theta_B)(K_z + \omega_0 + \theta_B)}. \quad (62)$$

The roll angle φ and the yaw angle ψ of the backcoupled system can be estimated by way of the Equation (7a, b) transformed into the s-range:

$$\phi = \frac{1}{K_{lx}} s \cdot (T_{dx}(s) - K_x \cdot h_x(s)) \cdot \frac{57.3}{|h_y|} \text{ [deg/rad]}, \quad (63a)$$

$$\psi = \frac{1}{K_{lz}} s \cdot (T_{dz}(s) - K_z \cdot h_z(s)) \cdot \frac{57.3}{|h_y|} \text{ [deg/rad]}, \quad (63b)$$

wherein the relationships determined in Equation (62) are used in Equations (63a, b) for $h_x(s)$ and $h_z(s)$.

Normally, $K_z$ is much larger than the amplitudes of the environmental torques in the normal operation. The quantity of the roll and yaw angle, that is, the precision, can be adjusted to be arbitrarily small and no longer depends, as previously, primarily on the sensor noise and on wheel friction torques.

3.4.4.2 Roll Angle Measurement and Yaw Angle Observer When Using a Compensation Torque 3.4.4.2.1 Fundamental Equations Equations (61a) and (61c) also apply in this case:

$$\dot{h}_x - \omega_0\Omega_x(h_c - \Theta_b \cdot h_x) = T_{dx} + T_{cx} + \Theta_b \cdot h_y \cdot \omega_0\Omega_N \quad (64a)$$

$$T_{cx} = -K_x \cdot h_x - \hat{T}_{ccx}, H_z, \dot{H}_z \approx 0 \quad (64b)$$

with the compensation torque T?.

When an observer is used, the spin wheel torque in the z-direction according to Equation (49g) is as follows:

$$-\dot{h}_z = \omega_0\Omega_N(h_x + \Theta_b h_z) + \dot{H}_z^{\cdot} - \underline{k}^T \hat{\underline{x}} + \phi_b h_y \cdot \omega_0\Omega_N. \quad (65)$$

In the following, it will now be shown how the estimation quantities (x) in Equation (65) can be eliminated. First, Equation (47e) and (49a) are transformed into the s-range.

$$-\underline{bk}^T\underline{x} = (aE - A)\underline{x} - \underline{b}T_{Dz}^* \quad (66a)$$

$$0 = sx_1 - \omega_g x_2. \quad (66b)$$

By means of the matrix A from Equation (47b) and the input vector $\underline{b}$ from Equation (47c), the following is obtained for the second line of Equation (66a):

$$-\Omega_{NO} \cdot \underline{k}^T\underline{x} = \Omega_{NO}x_1 - sx_2 - \Omega_N T_{Dz}^* \quad (66c)$$

The placing of Equation (66b) into Equation (66c) and the retransformation into the time range results in $$-\underline{k}^T\underline{x} = x_1 - \ddot{x}_1/(\Omega_{NO}\omega_0) - T_{Dz}^*. \quad (66d)$$

By neglecting $\ddot{x}_1/(\Omega_N\omega_0)$, the following is obtained $$-k^T\underline{x} = \tilde{x}_1 \cdot T_{Dz}^* \quad (66e)$$

and by means of Equation (54b)

$$-\underline{k}^T\underline{x}=x_1-T_{Dz}\dot{}. \tag{66f}$$

From Equation (52b), the following is obtained for small s and the observer parameter $h_1=0$ $$-\underline{k}^T\underline{x}=h_z/\Omega_{N0}\cdot\hat{T}_{Dx}+\hat{T}_{Dz}-T_{Dz}\dot{} \tag{66g}$$

Placing Equations (44b, c) and (49f, g) in Equation (66g), results in $$-\underline{k}^T\underline{x}=h_x/\Omega_{NO}(T_{dx}-\hat{T}_{Dz}+T_{cx})\cdot\hat{T}_{Dz} \tag{66k}$$

Placing Equation (66k) in Equation (65) with $H_z^* \approx 0$ results in $$\dot{h}_x + \omega_0(h_x + \theta_B h_z) + \frac{h_z}{\Omega_{NO}}(T_{dx} + \hat{T}_{Dx} + T_{cx}) - \hat{T}_{Dz} + \psi_b h_y \omega_0 = 0 \tag{67}$$

Laplace transforming of Equations (65, 67) and summarizing in vector writing results in:

$$\begin{bmatrix} h_x \\ h_z \end{bmatrix} = \frac{\begin{bmatrix} s+\omega_0\theta_B & \omega_0 \\ -\omega_0+\dfrac{h_z}{\Omega_{NO}}K_x & s+K_x+\omega_0\theta_0 \end{bmatrix}\left(\begin{bmatrix} T_{Dx}^0 \\ -\dfrac{h_z}{\Omega_{NO}}\cdot T_{Dx}^0 \end{bmatrix}+\begin{bmatrix} 0 \\ +\dfrac{h_z}{\Omega_N} \end{bmatrix}\hat{T}_{Dx}+\begin{bmatrix} 0 \\ 1 \end{bmatrix}\hat{T}_{Dz}+\begin{bmatrix} \phi_b\cdot h_y\cdot\omega_0 \\ \psi_b\cdot h_y\omega_0 \end{bmatrix}\right)}{s^2+(K_x+\omega_0\theta_B)s+\omega_0^2-\dfrac{h_z}{\Omega_{NO}}\cdot K_x\cdot\omega_0+\omega_0\theta_B(K_x+\omega_0\theta_B)} \tag{68}$$

written as $$T_{Dx}^0 = T_{dx} - \hat{T}_{ccx} \tag{69a}$$

$$T_{Dz}^0 = T_{dz} - \hat{T}_{ccz} \tag{69b}$$

In this case, $T_?$ and $T_{Dx}$ are estimated environmental torques which enter into the observer.

The external control torques for the spin discharge are:

$$T_{cx} = -K_x h_x = \hat{T}_{ccx} \tag{70a}$$

$$T_{cz} = -K_z h_z - \hat{T}_{ccz} \tag{70b}$$

The torques $\hat{T}_{ccx}$ and $\hat{T}_{ccz}$ are external compensation torques for the environmental torques in rolling and yawing.

Equation (68) shows that only external torques in the x-direction with the spin wheel components $h_x$ or $h_z$ can be observed.

3.4.4.2.2 Influence of the Roll and Yaw Preadjustment Angles

From Equation (68) while neglecting terms of a higher order $$h_{xb} = \frac{\omega_0^2 \cdot \psi_b \cdot h_y}{\omega_0^2 - \dfrac{h_z}{\Omega_{NO}}\cdot K_x\cdot\omega_0}\cdot\frac{\psi_b\cdot h_y}{\left(1-\dfrac{h_z}{\Omega_{NO}}\cdot\dfrac{K_x}{\omega_0}\right)} \tag{71a}$$

$$h_{zb} = -\phi_b\cdot h_y + \psi\cdot h_y\cdot\frac{\dfrac{K_x}{\omega_0}}{\left(1-\dfrac{h_z}{\Omega_{NO}}\dfrac{K_x}{\omega_0}\right)} \tag{71b}$$

These relationships are used in the further investigation for the spin vector.

3.4.4.2.3 Yaw Angle Errors by Means of Environmental Torques

The environmental torques in the normal operating condition can be represented in the satellite system of coordinates as $$T_{dx}=A_{0x}+A_I\cos\omega t-T_{DxR}(\omega,t) \tag{72a}$$

$$T_{dz}=A_{0z}-A_I\sin\omega t-T_{DzR}(\omega,t) \tag{72b}$$

The components $A_{0x}$, $A_{0z}$ originate from the asymmetrical configuration of the space missile and are a function of the reflection coefficients and of the sun vector. They depend on the season and are assumed to be constant for a day. Although $A_{0x}$, $A_{0z}$ are not easy to determine, the ratio $A_{0x}/A_{0z}$ is generally well known. Thus, when one component is determined, the other component can be calculated by the known ratio of the components. The most influential component of the environmental torques $T_{Dx}$, $T_{Dz}$ is the inertial-constant component $A_I$ which depends directly on the displacement of the center of gravity, the asymmetrical shape of the solar generator, the reflection coefficients, the sun vector and additional seasonally dependent effects. Generally, this component causes the large yaw angle error if only the measured, back-coupled roll angle is used for the yaw angle observer.

The residues $T_{DxR}$, $T_{DzR}$ can normally be neglected. In the case of very large solar wings, also higher-frequency vibrations must be taken into account in the error estimation.

3.4.4.2.3.1 Influence of the Inertial-Constant Component of the Environmental Torques For the environmental torques in Equations (72a, b), first only the influence of the inertial-constant component will be examined; that is $$T_{dx}=T_{DIx}=+A_I\cos\omega t \tag{73a}$$

$$T_{dz}=T_{DIz}=-A_I\sin\omega t, \tag{73b}$$

from which the relationship $$T_{DIz}=\frac{1}{\omega_0}\cdot\dot{T}_{DIx} \tag{73c}$$

can be derived in a simple manner.

The placing of Equations (28b, 46b, 54b) in one another results in the following for the yaw angle error $$\psi=\frac{1}{\omega_0}\cdot\tilde{x}_1\cdot\frac{57.3}{|h_y|}\quad[\text{deg/rad}] \tag{74a}$$

and the estimation error $x_1$ is calculated according to Equation (49b) with $h_1=0$, $s=0$:

$$\tilde{x}_1 = (T_{DIz} - K_z \cdot h_z) + \frac{h_2}{\Omega_{NO}}(T_{DIx} - K_x \cdot h_x) \quad (74b)$$

In this case, the environmental inputs into the observer were set to zero; that is, $$\hat{T}_{Dx}=0 \quad (75a)$$

$$\hat{T}_{Dz}=0. \quad (75b)$$

In Equation (74b), the spin components $h_x$ and $h_z$ must also be determined. These are calculated by means of Equation (68) without a bias angle ($\Theta_b = \Theta_{b\psi b} = 0$) in the case of the frequency $\omega_o$:

$$h_x(j\omega_0) = \frac{T_{DIx}}{K_x}; \quad h_z(j\omega_0) = \frac{T_{DIz}}{K_x} \quad (76a; 76b)$$

Placing Equation (76a, b) in Equation (74b) and then in Equation (74a) results in $$\tilde{x}_1 = T_{DIz} - \frac{K_z}{K_x} \cdot T_{DIz} + \frac{h_z}{\Omega_N}\left(T_{DIx} - \frac{K_x \cdot T_{DIx}}{K_x}\right) \quad (77a)$$

$$\psi = T_{DIz}\left(1 - \frac{K_z}{K_x}\right) \cdot \frac{57.3}{|h_y| \cdot \omega_0}. \quad (77b)$$

For the amplitude of the yaw angle vibration, the following is therefore obtained:

$$\hat{\psi} = A_I\left(1 - \frac{K_z}{K_x}\right) \cdot \frac{57.3}{|h_y| \cdot \omega_0} \quad (77c)$$

Equation (77c) indicates that the inertial-constant component $A_I$ has no influence on the amplitude of the yaw angle error when $K_x = K_z$ is selected for the controller parameters.

3.4.4.2.3.2 Influence of the Path-Constant Component of the Environmental Torques.

The path-constant components $A_{0x}$ and $A_{0z}$ of the environmental torques in the normal operating condition in Equation (72a, b) can be estimated by means of two processes which will be introduced in the following.

1st Process

First, the bias components are subtracted from the spin wheel components. The following is obtained from Equation (68) while neglecting terms of a higher order (such as $\omega_o \Theta_\beta$) and after the subtraction of the bias components indicated in Equations (71a, b):

$$h_x^* = h_x - h_{xb} = \frac{-T_{Dx}^0 \cdot \frac{h_z}{\Omega_{NO}}}{\omega_0 - \frac{h_z}{\Omega_{NO}} \cdot K_x}, \quad (78a)$$

$$h_z^* = h_z - h_{xb} = \frac{-T_{Dx}^0}{\omega_0 - \frac{h_z}{\Omega_{NO}} \cdot K_x}, \quad (78b)$$

wherein for the interference inputs into the observer and the observer parameter $h_1$ the following was selected:

$$\hat{T}_{Dx} = \hat{T}_{Ds} = 0; \quad h_1 = 0. \quad (78c)$$

Placing the Equations (69a, b) in Equations (78a, b) results in:

$$h_x^* = \frac{-T_{dx} - \hat{T}_{ccx}}{\omega_0 - \frac{h_x}{\Omega_{NO}} \cdot K_x} \quad (79a)$$

$$h_z^* = \frac{-(T_{dz} + \hat{T}_{ccz}) \cdot \frac{h_2}{\Omega_{NO}}}{\omega_0 - \frac{h_z}{\Omega_{NO}} \cdot K_x} \quad (79b)$$

Because only the influence of the constant component $A_{0x}$ of the interference $T_{dx}$ in Equation (72a) is to be examined, the higher-frequency vibration components are averaged over a day; that is, vibration components with the frequency $n + \omega_o (n \cong 1, 2, 3, \ldots)$ have no influence:

$$\bar{h}_x = \frac{1}{T_{per}} \int_0^{T_{per}} h_x^* dt; \quad T_{per} = \frac{1}{\omega_0} \cdot 2\pi \quad (80a)$$

$$\bar{h}_z = \frac{1}{T_{per}} \int_0^{T_{per}} h_z^* dt \quad (80b)$$

The result of the integration is:

$$\bar{h}_z = \frac{-(A_{0x} - \hat{T}_{ccx})}{\left(\omega_0 - \frac{h_2}{\Omega_{NO}} \cdot K_x\right)} \quad (81a)$$

$$\bar{h}_x = \frac{-(A_{0x} - \hat{T}_{ccx})\frac{h_2}{\Omega_{NO}}}{\left(\omega_0 - \frac{h_2}{\Omega_{NO}} \cdot K_x\right)} \quad (81b)$$

The estimation error $x_1$ is calculated according to the Equation (52b) with $h_1 = 0$, $s = 0$:

$$\tilde{x}_1 = T_{DOz}^0 - K_z \cdot \bar{h}_2 + \frac{h_z}{\Omega_{NO}}(T_{DOx}^0 - K_x \cdot \bar{h}_x) \quad (82)$$

with $$T_{DOx}^0 = A_{0x} - T_{ccx} \quad (83a)$$

$$T_{DOz}^0 = A_{0z} - T_{ccz}. \quad (83b)$$

A simple model for the relationship between $A_{0x}$ and $A_{0z}$ is:

$$A_{0z} = C A_{0x}, \quad (84)$$

Wherein the constant C depends on the configuration of the space missile and the season.

In the following an iteration algorithm is introduced by means of which the compensation torques $T_{ccx}$ and $T_{ccz}$ can be calculated:

$$\tilde{x}_1 = T_{DOzj}^0 + \frac{\left(K_z + \omega_0 \frac{h_z}{\Omega_{NO}}\right)}{\left(\omega_0 - \frac{h_z}{\Omega_{NO}} \cdot K_x\right)} \cdot T_{DOxj}^0 \tag{85a}$$

$$j = \text{INT}\left(\frac{1}{T_{per}} \int_0^t d\tau^0\right) \tag{85b}$$

$$j \le 0: \hat{T}_{ccj} = 0, \overline{h}_z(j) = 0 \tag{85c}$$

$$T_{DOx}(j) = -\overline{h}_z(j) \cdot \left(\omega_0 - \frac{h_z}{\Omega_{NO}} \cdot K_x\right) \tag{85d}$$

$$\hat{T}_{ccx}(j) = f(j) \cdot T_{DOx}(j) + \hat{T}_{ccx}(j-1) \tag{85e}$$

$$f(j) = k_0 + k_{ie}^{-j} \tag{85f}$$

$$\hat{T}_{ccz}(j) = C \cdot \hat{T}_{ccx}(j); \ 0 < K_0 + k_1 < 1 \tag{85g}$$

The effects of uncertainties in the parameters C and $A_I$, $\Delta C$ and $\Delta A_I$, on the yaw angle error can be drastically reduced. From Equation (85b), a yaw angle estimation error of $$\Delta \tilde{x}_1 = \Delta A_{Oz} + \Delta A_{Ox} \cdot \left(\frac{K + \omega_0 \frac{h_z}{\Omega_{NO}}}{\omega_0 - K \frac{h_z}{\Omega_{NO}}}\right) \tag{86a}$$

$$\Delta \psi = \Delta \tilde{x}_1 \cdot \frac{57.3 \text{ deg}}{|h_y| \cdot \omega_0}. \tag{86c}$$

is obtained.

The estimation error in Equation (86a) can be converted into the yaw angle error by using the Equations (28b, 46b, 54b). The residue component of the z-environmental torque in Equation (72b), $T_{dzR}(\omega, t)$, cannot be estimated in the yaw observer $$\Delta A_{Oz} = \Delta C \cdot A_{Ox} + \Delta C \cdot A_{Ox} \tag{86b}$$

However, it is normally of little significance.

The remaining yaw angle error is therefore calculated at:

$$\psi_R = \Delta \psi + T_{DzR} \cdot \frac{57.3 \text{ deg}}{|h_y| \cdot \omega_0}. \tag{86d}$$

2nd Process

Another process for the estimation and compensation of path-constant environmental torque components is also based on Equation (68). The idea of this process is the use of compensation torques as observer interference inputs. In principle, a combination of the first and the second process is also conceivable in which the environmental torques are partially compensated and partially environmental torques are calculated for the observer.

As in the first process, the bias components are subtracted from the spin wheel components. From Equation (68), while neglecting terms of a higher order (such as $\omega_o \Theta_\beta$) and after the subtraction of the bias components indicated in Equations (71a, b), the following is obtained:

$$h_x^* = h_x - h_{xb} = \frac{-\frac{h_2}{\Omega_N} T_{Dx}^0 + \frac{h_2}{\Omega_N} \hat{T}_{Dx} + \hat{T}_{Dz}}{\omega_0 - \frac{h_x}{\Omega_{NO}} \cdot K_x}, \tag{87a}$$

$$h_z^* = h_z - h_{zb} = \frac{-T_{Dx}^0 + \frac{h_2}{\omega_0} \frac{K_x}{\Omega_N} \hat{T}_{Dx} + \frac{K_x}{\omega_0} \hat{T}_{Dz}}{\omega_0 - \frac{h_x}{\Omega_{NO}} \cdot K_x} \tag{87b}$$

with the interference inputs $\hat{T}_{Dx}$ and $\hat{T}_{Dz}$ to be determined.

As in the first process, instead of $h_x^*$ and $h_z^*$, their values averaged over a day are used; see Equations (81a,b). Written as $$h_2/\Omega_N =: a \tag{88a}$$

$$K_x/\omega_0 =: K_x^* \tag{88b}$$

$$\omega_0 h_2/\Omega_N K_x =: K \tag{88c}$$

$$\overline{H}_x^* =: h_x K \tag{88d}$$

$$\overline{H}_z^* =: h_z K \tag{88e}$$

the following is obtained for Equation (87)

$$\overline{H}_x^* = -a T_{Dx}^0 + a \hat{T}_{Dx} + \hat{T}_{Dz} \tag{89a}$$

$$\overline{H}_z^* = -T_{Dx}^0 + K_x^* (a \hat{T}_{Dx} + \hat{T}_{Dz}). \tag{89b}$$

From Equation (89b) the following is obtained $$T_{Dx}^0 = -\overline{H}_z^* + K_x^* (a \hat{T}_{Dx} + \hat{T}_{Dz}). \tag{89c}$$

This term is used in order to compute such interference inputs for the observer that the yaw estimation error becomes as small as possible.

The estimation error $x_1$ is calculated according to Equation (52b) with $h_1=0$, s=o:

$$\tilde{x}_1 = \frac{h_2}{\Omega_N} \tilde{T}_{Dx} + \tilde{T}_{Dz} \tag{90}$$

By means of Equations (49f,g), (44b,c), (70a,b) and (69a,b), the following is obtained for Equation (90)

$$\tilde{x}_1 = \frac{h_2}{\Omega_N} \left(T_{Dx}^0 - \tilde{T}_{Dx} - \frac{K_x}{K} \overline{H}_x^*\right) + \left(T_{Dz}^0 - \hat{T}_{Dz} - \frac{K_z}{K} \overline{H}_z^*\right) \tag{91}$$

In the first bracketed expression in Equation (91), all terms are known or measurable, so that a useful condition for the observer interference inputs $T_{Dx}$ and $T_{Dz}$ to be designed is to set the bracketed expression to zero. By means of Equation (89c), the following will then be obtained $$-\overline{K}_x^* \frac{K_x}{K} - \hat{T}_{Dx} - \overline{K}_x^* + K_z^* (a \hat{T}_{Dx} + \hat{T}_{Dz}) = 0 \tag{92a}$$

In the second bracketed expression of Equation (91), the interference quantity T?, which cannot be observed, is entered into the interference term $T_{Dx} = T_{Dz} - T_{ccz}$ (Equation 69b) so that no combination can be found from $T_{Dx}$ and $T_{Dz}$ for which the right bracketed expression is zero. Therefore, $$\hat{T}_{Dz} = -\frac{K_z}{K}\overline{H}_z^* \qquad (92b)$$

is selected as the second condition. The use of Equation (92b) in Equation (92a) leads to the observer interference input in the x-direction:

$$\hat{T}_{Dx} = \omega_0 \frac{-\overline{h}_x K_x - \overline{h}_z\left(\omega_0 + K_z\left(\frac{K_z}{\omega_0} - \frac{h_2}{\Omega_N}\right)\right)}{\omega_0 - \frac{h_2}{\Omega_N}K_x} \qquad (92c)$$

We claim:

1. Arrangement for the attitude control and stabilization of a three-axis-stabilized, bias momentum spacecraft which is equipped with a spin wheel arrangement which is capable of generating an angular momentum vector in a predeterminable direction (pitch axis) as well as control torques about all three axes of a spacecraft-fixed system of coordinates independently of one another, and is equipped with an attitude sensor which measures the attitude deviation about a first lateral axis (roll axis) oriented perpendicularly to the predeterminable direction, and with actuators for generating external control torques, characterized by a decoupling controller which, using the deviation signal (roll angle φ) and taking into account the magnitude $h_y$ of the angular momentum generated by the spin wheel arrangement, provides a control signal, which causes the unidirectional decoupling of the roll dynamics from the yaw dynamics, for the spin wheel arrangement for generating a control torque $$T_{WZD} = H_z \text{ with } H_z = -h_y\phi$$

about a second lateral axis (yaw axis) which is orthogonal to the predeterminable direction and to the first lateral axis.

2. Arrangement according to claim 1, an attitude sensor being present which, in addition, measures the attitude deviation about the second lateral axis (yaw axis), characterized in that the decoupling controller is designed such that, using the deviation signal (yaw angle ψ) additionally furnished by the attitude sensor, it provides another control signal for the spin wheel arrangement for generating a control torque $$T_{WXD} = -\dot{H}_x \text{ with } H_x = h_y\psi$$

about the first lateral axis, thereby also causing the uncoupling of the yaw dynamics from the roll dynamics.

3. Arrangement for the attitude control and stabilization of a three-axis-stabilized, bias momentum spacecraft which is equipped with a spin wheel arrangement which is capable of generating an angular momentum vector in a predeterminable direction (pitch axis) as well as control torques about all three axes of a spacecraft-fixed system of coordinates independently of one another, and is equipped with an attitude sensor which measures the attitude deviation about a first lateral axis (roll axis) oriented perpendicularly to the predeterminable direction, and with actuators for generating external control torques, characterized by a closed control circuit for controlling the attitude deviation about the first lateral axis by means of control signals for the spin wheel arrangement, and, by a reduced observer of only the second order for the estimation of the attitude deviation about a second lateral axis (yaw axis) orthogonal to the predeterminable direction and to the first lateral axis, and, when the measurable quantity for this observer is formed, the transmission function of the closed control circuit for the first lateral axis is taken into account.

4. Process for the attitude control and stabilization of a three-axis-stabilized, bias momentum spacecraft which orbits on an orbit around a celestial body, for example, the earth, and which is equipped with a spin wheel arrangement which is capable of generating an angular momentum vector in a predeterminable direction (pitch axis) as well as control torques about all three axes of a spacecraft-fixed system of coordinates independently of one another, is equipped with attitude sensors which measure the attitude deviations about two lateral axes (roll axis, yaw axis) oriented perpendicularly to one another and perpendicularly to the predeterminable direction, and equipped with actuators for generating external control torques, characterized in that, for the case of an absent attitude deviation measurement with respect to one of the two lateral axes (yaw axis) on a section of the orbit, for the estimation of this absent attitude deviation (yaw deviation ψ), an observer is used and estimated disturbance torques are supplied to it according to a time-dependent function which disturbance torques can be determined from quantities for the disturbance torques as well as for their derivatives with reference to time which, on the one hand were determined before the entering of the spacecraft into the section of the orbit and, on the other hand, were determined after the preceding exit from this section by a time-related integration of $H_x = h_y\psi$ and $H_z = -h_y\phi$, $h_y$ being the value of the torque generated by the spin wheel arrangement in the predeterminable direction, and φ, ψ being the attitude deviations about the two lateral axes measured by the attitude sensors outside the section of the orbit.

* * * * *